United States Patent
Kikuchi et al.

(10) Patent No.: US 9,477,742 B2
(45) Date of Patent: Oct. 25, 2016

(54) UPDATE CONTROL DEVICE, UPDATE CONTROL PROGRAM, AND UPDATE CONTROL METHOD

(71) Applicant: FUJITSU LIMITED, Kawasaki-shi, Kanagawa (JP)

(72) Inventors: Shinji Kikuchi, Yokohama (JP); Yasuhide Matsumoto, Kawasaki (JP); Masazumi Matsubara, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 214 days.

(21) Appl. No.: 14/245,240

(22) Filed: Apr. 4, 2014

(65) Prior Publication Data
US 2014/0222818 A1    Aug. 7, 2014

Related U.S. Application Data

(63) Continuation of application No. PCT/JP2011/073139, filed on Oct. 6, 2011.

(51) Int. Cl.
G06F 7/00 (2006.01)
G06F 17/30 (2006.01)
G06F 11/30 (2006.01)
G06F 9/445 (2006.01)

(52) U.S. Cl.
CPC ......... G06F 17/30598 (2013.01); G06F 11/30 (2013.01); G06F 11/3006 (2013.01); G06F 11/3051 (2013.01); G06F 8/65 (2013.01)

(58) Field of Classification Search
CPC .................................. G06F 17/30598
See application file for complete search history.

(56) References Cited

U.S. PATENT DOCUMENTS

| | | | | |
|---|---|---|---|---|
| 2009/0044042 A1* | 2/2009 | Fujiwara | ............... | F01K 13/006 714/3 |
| 2009/0100420 A1* | 4/2009 | Sapuntzakis | ............... | G06F 8/65 717/171 |
| 2010/0138526 A1* | 6/2010 | DeHaan | ............... | H04L 41/0806 709/223 |
| 2011/0320595 A1* | 12/2011 | Konishi | ............... | G06F 19/3412 709/224 |
| 2012/0084761 A1* | 4/2012 | Maeda | ............... | G06F 8/433 717/132 |

FOREIGN PATENT DOCUMENTS

| | | |
|---|---|---|
| JP | 2006-119848 | 5/2006 |
| JP | 2009-59186 | 3/2009 |
| JP | 2009-245029 | 10/2009 |
| WO | WO 2010/029602 A1 | 3/2010 |

OTHER PUBLICATIONS

International Search Report mailed Dec. 6, 2011 in corresponding International Patent Application No. PCT/JP2011/073139.

* cited by examiner

*Primary Examiner* — Loan T Nguyen
(74) *Attorney, Agent, or Firm* — Staas & Halsey LLP

(57) ABSTRACT

An update control device includes an acquiring unit, a classifying unit, and an update processing unit. The acquiring unit acquires component information that indicates a component in multiple devices. The classifying unit calculates the similarity of the component information related to the multiple devices acquired by the acquiring unit and classifies, on the basis of the calculated similarity, the multiple devices into one or multiple device groups. The update processing unit performs a process for updating systems of the devices that are classified into the same device group by the classifying unit.

4 Claims, 24 Drawing Sheets

FIG.4

| TARGET ID | TARGET TYPE | NUMBER OF VMS | VM TYPE | NUMBER OF APPLICATIONS | APPLICATION TYPE | NUMBER OF TENANTS | TENANT TYPE | TENANT OWNER |
|---|---|---|---|---|---|---|---|---|
| VMM1 | Xen 4.0 | 2 | CentOS 4.0, 4.5 | 2 | Apache 2.4, MySQL 4.1 | 1 | GENERAL | A |
| VMM2 | Xen 4.0 | 2 | CentOS 4.0, 4.5 | 2 | Apache 2.4, 2.6 | 1 | GENERAL | B |
| VMM3 | Xen 3.5 | 2 | CentOS 4.0, 4.5 | 2 | Apache 2.4, MySQL 5.1 | 1 | GENERAL | B |
| VMM4 | Xen 3.5 | 2 | CentOS 4.0, 4.5 | 2 | Apache 2.4, MySQL 4.1 | 2 | GENERAL | C, D |
| VMM5 | Xen 3.0 | 2 | CentOS 4.0, 4.5 | 2 | Apache 2.4, MySQL 4.1 | 1 | GENERAL | E |
| VMM6 | Xen 4.0 | 2 | CentOS 4.0, 4.5 | 2 | Apache 2.4, MySQL 4.1 | 1 | GENERAL | E |
| VMM7 | Xen 4.0 | 2 | CentOS 4.0, 4.5 | 2 | Apache 2.4, MySQL 4.1 | 1 | GENERAL | F |
| VMM8 | Xen 4.0 | 2 | CentOS 4.0, 4.5 | 2 | Apache 2.4, MySQL 4.1 | 1 | GENERAL | F |
| VMM9 | Xen 3.5 | 2 | CentOS 4.0, 4.5 | 2 | Apache 2.4, MySQL 4.1 | 1 | GENERAL | F |
| VMM10 | Xen 3.5 | 2 | CentOS 3.0, 4.5 | 2 | Apache 2.4, MySQL 4.1 | 2 | GENERAL | G, H |
| VMM11 | Xen 4.0 | 2 | CentOS 4.0, 4.5 | 2 | Apache 2.4, MySQL 4.1 | 2 | GENERAL | I, J |
| VMM12 | Xen 4.0 | 2 | CentOS 4.0, 4.5 | 2 | Apache 2.4, MySQL 4.1 | 2 | GENERAL | K, L |
| VMM13 | Xen 4.0 | 4 | CentOS 4.0, 4.5 | 4 | Apache 2.4, 2.6 MySQL 4.1 | 1 | GENERAL | M |
| VMM14 | Xen 3.5 | 2 | CentOS 4.0, 4.5 | 2 | Apache 2.4, MySQL 4.1 | 1 | GENERAL | N |
| VMM15 | Xen 4.0 | 1 | CentOS 4.0 | 1 | VM MANAGEMENT | 1 | ADMINISTRATOR | INFRASTRUCTURE ADMINISTRATOR |
| VMM16 | Xen 4.0 | 1 | CentOS 4.0 | 1 | VM MANAGEMENT | 1 | ADMINISTRATOR | INFRASTRUCTURE ADMINISTRATOR |

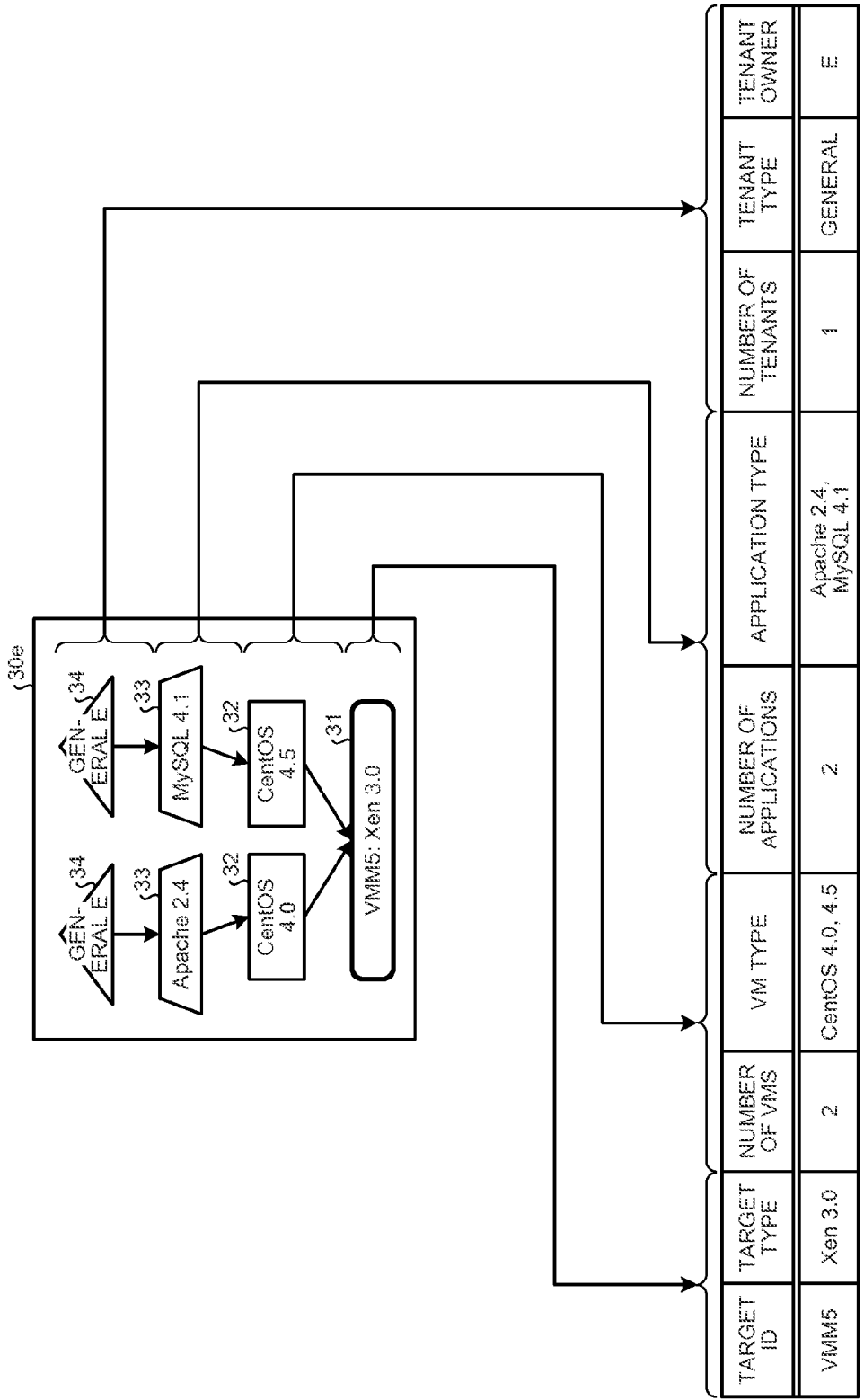

FIG.6

| WORKFLOW ID | CONTENT |
|---|---|
| WF-01 | APPLY MODIFICATION PROGRAM |
| WF-02 | MIGRATION |
| ... | ... |

FIG.7

| OPERATION ID | CONTENT | COMMAND DEFINITION | SUBSEQUENT PROCESS AFTER SUCCESS | SUBSEQUENT PROCESS AFTER FAILURE |
|---|---|---|---|---|
| WF-01-1 | START | - | WF-01-2 | - |
| WF-01-2 | LOG IN | ssh XXXX | WF-01-3 | - |
| WF-01-3 | BACKUP | vm-snapshot | WF-01-4 | - |
| WF-01-4 | APPLY PATCH | patch YYY | WF-01-5 | WF-01-8 |
| WF-01-5 | REBOOT | shutdown -r | WF-01-6 | - |
| WF-01-6 | CHECK OPERATION | http://xxx... | WF-01-7 | WF-01-8 |
| WF-01-7 | LOG OUT | exit | WF-01-10 | - |
| WF-01-8 | RESTORE | vm-revert | WF-01-9 | - |
| WF-01-9 | REPORT | mail | VF-01-10 | - |
| WF-01-10 | END | - | - | - |

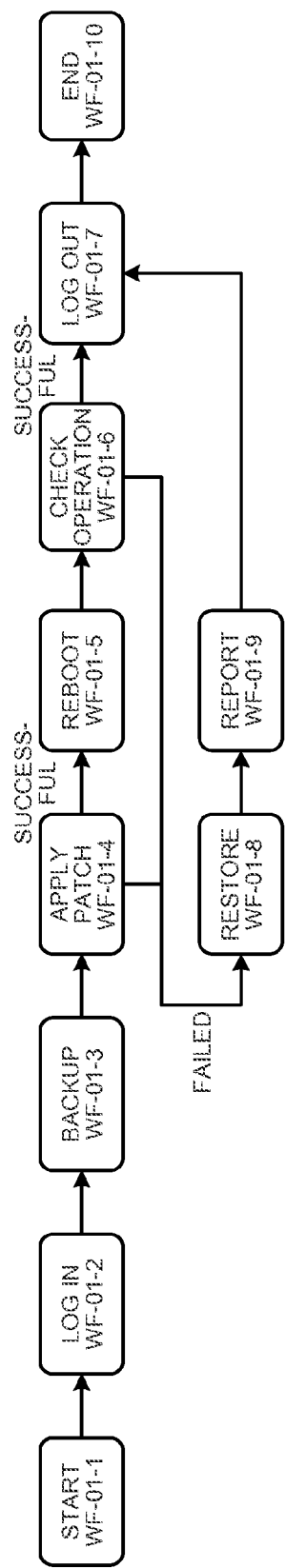

FIG.9

| INSTANCE ID | START DATE AND TIME | EXECUTION WORKFLOW | EXECUTION TARGET DEFINITION |
|---|---|---|---|
| WF_patch_20110415 | 2011/4/15 03:00 | WF-01 | TARGET APPLICATION FOR PATCH: Apache PATCH FILE: patch-0.5.1.2 TARGET SERVER FOR PATCH: SERVER DEVICE 30a TO 30p |
| WF_migration_20110416 | 2011/4/16 22:00 | WF-02 | ... |
| ... | ... | | |

FIG.10

| INSTANCE ID | CONTROL CONDITION |
|---|---|
| WF_patch_20110415 | PERFORM STEP EXECUTION ON WORKFLOW (PERFORM VISUALLY INSTEAD OF PERFORMING AUTOMATICALLY) |
| ... | ... |

FIG.11

| TARGET INFORMATION | TARGET TYPE | NUMBER OF SAMPLES M | NUMBER OF SAMPLE TYPES | NUMBER OF TARGETS N | n/m | INFORMATION VOLUME I | AVERAGE INFORMATION VOLUME H | I/H |
|---|---|---|---|---|---|---|---|---|
| Xen 3.0 | Xen | 16 | 3 | 1 | 0.06 | 4.00 | 1.20 | 3.34 |
| Xen 3.5 | Xen | 16 | 3 | 5 | 0.31 | 1.68 | 1.20 | 1.40 |
| Xen 4.0 | Xen | 16 | 3 | 10 | 0.63 | 0.68 | 1.20 | 0.57 |
| NUMBER OF VMS 1 | NUMBER OF VMS | 16 | 3 | 2 | 0.13 | 3.00 | 0.87 | 3.45 |
| NUMBER OF VMS 2 | NUMBER OF VMS | 16 | 3 | 13 | 0.81 | 0.30 | 0.87 | 0.34 |
| NUMBER OF VMS 4 | NUMBER OF VMS | 16 | 3 | 1 | 0.06 | 4.00 | 0.87 | 4.61 |
| CentOS 3.0 | VM TYPE | 30 | 3 | 1 | 0.03 | 4.91 | 1.18 | 4.17 |
| CentOS 4.0 | VM TYPE | 30 | 3 | 15 | 0.50 | 1.00 | 1.18 | 0.85 |
| CentOS 4.5 | VM TYPE | 30 | 3 | 14 | 0.47 | 1.10 | 1.18 | 0.93 |
| NUMBER OF APPLICATIONS 1 | NUMBER OF APPLICATIONS | 16 | 3 | 2 | 0.13 | 3.00 | 0.87 | 3.45 |
| NUMBER OF APPLICATIONS 2 | NUMBER OF APPLICATIONS | 16 | 3 | 13 | 0.81 | 0.30 | 0.87 | 0.34 |
| NUMBER OF APPLICATIONS 4 | NUMBER OF APPLICATIONS | 16 | 3 | 1 | 0.06 | 4.00 | 0.87 | 4.61 |
| Apache 2.4 | APPLICATION TYPE | 31 | 5 | 14 | 0.45 | 1.15 | 1.72 | 0.67 |
| Apache 2.6 | APPLICATION TYPE | 31 | 5 | 2 | 0.06 | 3.95 | 1.72 | 2.30 |
| MySQL 4.1 | APPLICATION TYPE | 31 | 5 | 12 | 0.39 | 1.37 | 1.72 | 0.80 |
| MySQL 5.1 | APPLICATION TYPE | 31 | 5 | 1 | 0.03 | 4.95 | 1.72 | 2.88 |
| VM MANAGEMENT | APPLICATION TYPE | 31 | 5 | 2 | 0.06 | 3.95 | 1.72 | 2.30 |
| NUMBER OF OWNERS 1 | NUMBER OF OWNERS | 16 | 2 | 12 | 0.75 | 0.42 | 0.81 | 0.51 |
| NUMBER OF OWNERS 2 | NUMBER OF OWNERS | 16 | 2 | 4 | 0.25 | 2.00 | 0.81 | 2.47 |
| TENANT: GENERAL | TENANT TYPE | 16 | 2 | 14 | 0.88 | 0.19 | 0.54 | 0.35 |
| TENANT: ADMINISTRATOR | TENANT TYPE | 16 | 2 | 2 | 0.13 | 3.00 | 0.54 | 5.52 |
| A | OWNER NAME | 20 | 15 | 1 | 0.05 | 4.32 | 3.78 | 1.14 |
| B | OWNER NAME | 20 | 15 | 2 | 0.10 | 3.32 | 3.78 | 0.88 |
| C | OWNER NAME | 20 | 15 | 1 | 0.05 | 4.32 | 3.78 | 1.14 |
| D | OWNER NAME | 20 | 15 | 1 | 0.05 | 4.32 | 3.78 | 1.14 |
| E | OWNER NAME | 20 | 15 | 2 | 0.10 | 3.32 | 3.78 | 0.88 |
| F | OWNER NAME | 20 | 15 | 3 | 0.15 | 2.74 | 3.78 | 0.72 |
| G | OWNER NAME | 20 | 15 | 1 | 0.05 | 4.32 | 3.78 | 1.14 |
| H | OWNER NAME | 20 | 15 | 1 | 0.05 | 4.32 | 3.78 | 1.14 |
| I | OWNER NAME | 20 | 15 | 1 | 0.05 | 4.32 | 3.78 | 1.14 |
| J | OWNER NAME | 20 | 15 | 1 | 0.05 | 4.32 | 3.78 | 1.14 |
| K | OWNER NAME | 20 | 15 | 1 | 0.05 | 4.32 | 3.78 | 1.14 |
| L | OWNER NAME | 20 | 15 | 1 | 0.05 | 4.32 | 3.78 | 1.14 |
| M | OWNER NAME | 20 | 15 | 1 | 0.05 | 4.32 | 3.78 | 1.14 |
| N | OWNER NAME | 20 | 15 | 1 | 0.05 | 4.32 | 3.78 | 1.14 |
| ADMINISTRATOR | OWNER NAME | 20 | 15 | 2 | 0.10 | 3.32 | 3.78 | 0.88 |

FIG. 12

| TARGET ID | TARGET TYPE | NUMBER OF VMS | VM TYPE | NUMBER OF APPLICATIONS | APPLICATION TYPE | NUMBER OF OWNERS | TENANT TYPE | TENANT OWNER | NUMBER OF MINORITY |
|---|---|---|---|---|---|---|---|---|---|
| VMM1 | Xen 4.0 | 2 | CentOS 4.0, 4.5 | 2 | Apache 2.4, MySQL 4.1 | 1 | GENERAL | A | 0 |
| VMM2 | Xen 4.0 | 2 | CentOS 4.0, 4.5 | 2 | Apache 2.4, 2.6 | 1 | GENERAL | B | 1 |
| VMM3 | Xen 3.5 | 2 | CentOS 4.0, 4.5 | 2 | Apache 2.4, MySQL 5.1 | 1 | GENERAL | B | 1 |
| VMM4 | Xen 3.5 | 2 | CentOS 4.0, 4.5 | 2 | Apache 2.4, MySQL 4.1 | 2 | GENERAL | C,D | 1 |
| VMM5 | Xen 3.0 | 2 | CentOS 4.0, 4.5 | 2 | Apache 2.4, MySQL 4.1 | 1 | GENERAL | E | 1 |
| VMM6 | Xen 4.0 | 2 | CentOS 4.0, 4.5 | 2 | Apache 2.4, MySQL 4.1 | 1 | GENERAL | E | 0 |
| VMM7 | Xen 4.0 | 2 | CentOS 4.0, 4.5 | 2 | Apache 2.4, MySQL 4.1 | 1 | GENERAL | F | 0 |
| VMM8 | Xen 4.0 | 2 | CentOS 4.0, 4.5 | 2 | Apache 2.4, MySQL 4.1 | 1 | GENERAL | F | 0 |
| VMM9 | Xen 3.5 | 2 | CentOS 4.0, 4.5 | 2 | Apache 2.4, MySQL 4.1 | 1 | GENERAL | F | 0 |
| VMM10 | Xen 3.5 | 2 | CentOS 3.0, 4.5 | 2 | Apache 2.4, MySQL 4.1 | 2 | GENERAL | G,H | 2 |
| VMM11 | Xen 4.0 | 2 | CentOS 4.0, 4.5 | 2 | Apache 2.4, MySQL 4.1 | 2 | GENERAL | I,J | 1 |
| VMM12 | Xen 4.0 | 2 | CentOS 4.0, 4.5 | 2 | Apache 2.4, MySQL 4.1 | 2 | GENERAL | K,L | 1 |
| VMM13 | Xen 4.0 | 4 | CentOS 4.0, 4.5 | 4 | Apache 2.4, 2.6, MySQL 4.1 | 1 | GENERAL | M | 3 |
| VMM14 | Xen 3.5 | 2 | CentOS 4.0, 4.5 | 2 | Apache 2.4, MySQL 4.1 | 1 | GENERAL | N | 0 |
| VMM15 | Xen 4.0 | 1 | CentOS 4.0 | 1 | VM MANAGEMENT | 1 | ADMINISTRATOR | INFRA-STRUCTURE ADMINISTRATOR | 4 |
| VMM16 | Xen 4.0 | 1 | CentOS 4.0 | 1 | VM MANAGEMENT | 1 | ADMINISTRATOR | INFRA-STRUCTURE ADMINISTRATOR | 4 |

| WORKFLOW TO BE EXECUTED | OPERATION TARGET (VMM ID) | ORDER OF EXECUTION (VMM ID) |
|---|---|---|
| WF-01 (NORMAL) | VMM1,2,3,4,5,6,7,8,9, 10,11,12,14 | VMM1,6,7,8,9,14 → VMM5, VMM4,11,12, VMM2,3 → VMM10 |
| WF-01' (EXCEPTION) | VMM13, 15, 16 | VMM13 → VMM15,16 |

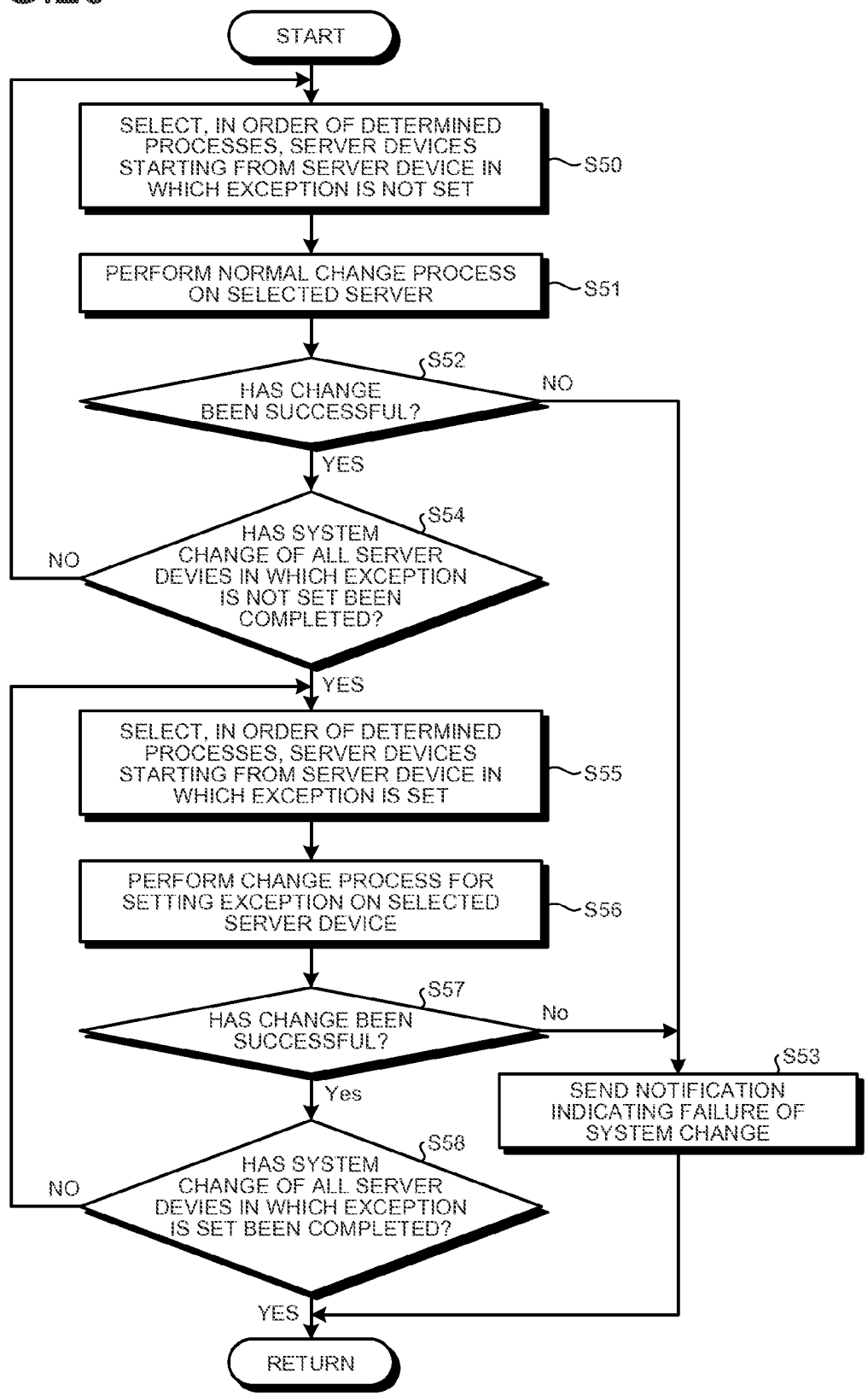

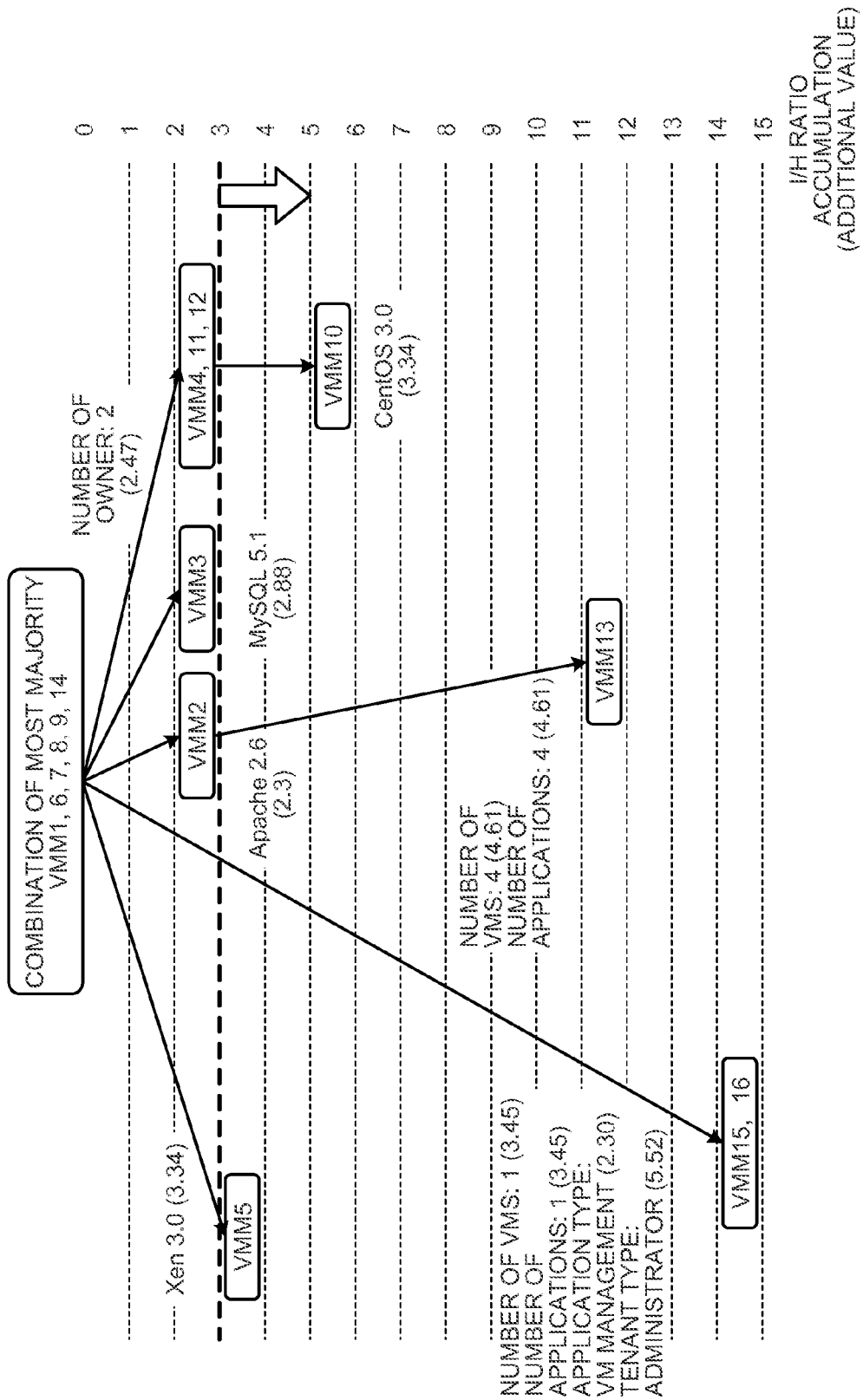

FIG.22

| CATEGORY | DEFINITION OF WORKFLOW TO BE EXECUTED | GROUPING CONDITION |
|---|---|---|
| ALMOST SECURE (GREAT MAJORITY) | NORMAL WORKFLOW WF-01 | I/H ACCUMULATION RATIO<3.0 |
| CAUTION NEEDED (SLIGHTLY DIFFERENT FROM GREAT MAJORITY) | RELIABLE WORKFLOW WF-01' (ADD VISUAL CHECKING TASK TO WF-01) | $3.0 \leq$ I/H ACCUMULATION RATIO<10.0 |
| DANGER (SIGNIFICANTLY DIFFERENT FROM GREAT MAJORITY) | CHECK WITH DOMAIN EXPERT (CHANGE TASK IS NOT EXECUTED) | $10.0 \leq$ I/H ACCUMULATION RATIO |

UPDATE CONTROL DEVICE, UPDATE CONTROL PROGRAM, AND UPDATE CONTROL METHOD

CROSS-REFERENCE TO RELATED APPLICATION

This application is a continuation application of International Application PCT/JP2011/073139, filed on Oct. 6, 2011, and designating the U.S., the entire contents of which are incorporated herein by reference.

FIELD

The embodiments discussed herein are directed to an update control device, an update control program, and an update control method.

BACKGROUND

In recent years, large scale systems are operated. For example, in data centers, systems are operated by a large number of physical servers or are operated by virtual machines (VMs) that are running on the physical servers. This type of large scale system is constituted by multiple components, such as hardware in each server, various kinds of software running on the server, or the like.

In a large scale system, there is a state in which, in an operation of operation management, such as a modification program being applied or a setting being changed, an administrator performs the same operation to a large number of servers. For example, there may be a case in which a modification program is applied to all of Apache version 2.4.x running on servers. The validity of such component change is checked and determined by, for example, a Change Advisory Board (CAB). Then, for a change target, such as a physical server, a virtual machine, or software that is allowed to be changed, a modification program is applied or the setting is changed by using a semi automated method, such as a batch process, that is performed in a series of the processes. The reason for using the semi automated method when the above change is performed is that a manual change is inefficient in terms of the time and the cost performance.

The following technology has been proposed as the related art. For example, there is a proposed technology that selects, as the target for updating software, an information processing apparatus having the same configuration as that of a specified information processing apparatus and applies a correction file to the selected information processing apparatus. Furthermore, for example, there is another proposed technology that stores know-how related to a component in a configuration management database (CMDB); checks, when a new component is added, the similarities between the component to be added and each component stored in the CMDB; and then associates the know-how of the component having a high similarity with the component to be added. This CMDB is referred to as a "configuration management database" and is a database that centrally manages information related to the components in each of the server devices.

Patent Literature 1: Japanese Laid-open Patent Publication No. 2006-119848

Patent Literature 2: Japanese Laid-open Patent Publication No. 2009-245029

In a large scale system, multiple devices provided from various vendors are used in combination. Different applications are operated in each physical server or in each virtual machine. Furthermore, even if the same applications are used, applications with different versions are operated. Furthermore, in a large scale system, because new applications or modification programs are produced every day, the state of each of the systems varies every day. Consequently, it is difficult for an administrator to grasp, before a change in a component, such as a modification program being applied to a component, the constraint related to the change in each of the physical servers or the virtual machines targeted for the change.

Consequently, in a large scale system, because an administrator does not find the constraint until a change task is performed on a component in a target device, such as each of the physical servers or the virtual machines, there may be a case in which the change performed in the component unexpectedly fails. Thus, there is a problem in that the reliability of the change task on a system is low.

Furthermore, with the related art, a change task can be stably performed on a system of a server device that includes components having the same configuration or similar configuration; however, for server devices that include components with different settings, this technology does not improve the reliability of a process for changing a system.

Furthermore, the physical servers or the virtual machines are described as an example of the target for a change; however, the problem described above also occurs when a change task is performed on a system of, for example, a network device, such as a storage device or a router.

SUMMARY

According to an aspect of an embodiment, an update control device includes an acquiring unit that acquires component information that indicates each of components in multiple devices; a classifying unit that calculates the similarity of each piece of the component information related to each of the multiple devices acquired by the acquiring unit and that classifies, on the basis of the calculated similarity, the multiple devices into one or multiple device groups; and an update processing unit that performs, by using a method for updating a common program, a process for updating systems of devices that are classified into the same device group by the classifying unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a schematic diagram illustrating an example configuration of data in a first table.

FIG. 5 is a schematic diagram illustrating the association relationship between information related to components in a server device and each item in the first table.

FIG. 6 is a schematic diagram illustrating an example configuration of data in a second table.

FIG. 7 is a schematic diagram illustrating an example configuration of data in a third table.

FIG. 8 is a schematic diagram illustrating the flow of the workflow that uses the modification program illustrated in FIG. 7.

FIG. 9 is a schematic diagram illustrating an example configuration of data in a fourth table.

FIG. 10 is a schematic diagram illustrating an example configuration of data in a fifth table.

FIG. 11 is a schematic diagram illustrating examples of the calculation results of I/H values that indicate the degree of exceptional information on each component illustrated in FIG. 4.

FIG. 12 is a schematic diagram illustrating examples of the results of determining whether information related to the components in the first table illustrated in FIG. 4 is the majority or the minority.

FIG. 20 is a flowchart illustrating the flow of a system update process.

FIG. 21 is a schematic diagram illustrating an example of the results of classifying server devices by using a tree structure in accordance with the type and the additional value of the degree of exception of the components that are determined to be the minority.

FIG. 22 is a schematic diagram illustrating an example of the grouping condition when the server devices are classified into three categories in accordance with the additional value of the degree of exception and the definition of the workflow that is performed.

DESCRIPTION OF EMBODIMENTS

Preferred embodiments of an update control device, an update control program, and an update control method according to the present invention will be described in detail below with reference to the accompanying drawings. The present invention is not limited to these embodiments. Furthermore, the embodiments can be appropriately used in combination as long as the processes do not conflict with each other.

[a] First Embodiment

Figure 1:
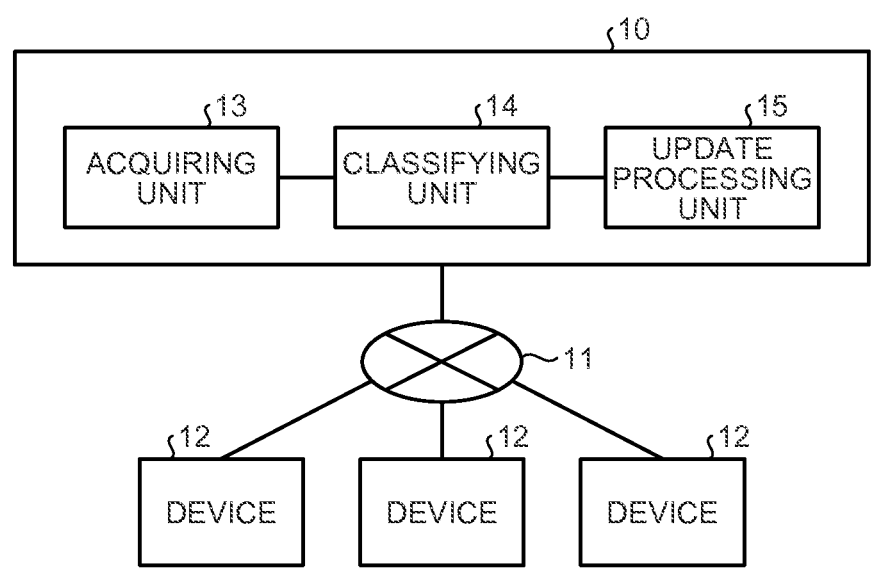
FIG. 1 is a schematic diagram illustrating the overall configuration of a system that includes an update control device.

In the following, an update control device according to a first embodiment will be described. FIG. 1 is a schematic diagram illustrating the overall configuration of a system of an update control device. An update control device 10 is a physical server that controls a process for updating a system and is a server computer for a management use installed in, for example, a data sensor or each corporation. The update control device 10 can communicate with devices 12 each of which is targeted for a change in a system via a network 11. An example of the devices 12 includes a network device, such as a server device, a storage device, a router, or the like. Any kind of communication network, such as the Internet, a local area network (LAN), a virtual private network (VPN), or the like, may be used as the network 11 irrespective of whether the network is wired or wireless.

As illustrated in FIG. 1, the update control device 10 includes an acquiring unit 13, a classifying unit 14, and an update processing unit 15.

The acquiring unit 13 acquires component information that indicates each of components in the multiple devices 12. For example, the acquiring unit 13 acquires information on a specific component from the multiple devices 12. for example, the update control device 10 requests each of the devices 12 to send information related to a component and then the acquiring unit 13 receives the information related to the component from each of the devices 12, whereby the acquiring unit 13 may also acquire the information related to the specific component. Furthermore, each of the devices 12 sends information on a component to the update control device 10 at a predetermined timing and the update control device 10 receives the information related to the component, whereby the acquiring unit 13 may also acquire the information related to the specific component. Examples of information related to a component to be acquired include information on hardware in the devices 12, information on software running on the devices 12, information on the version of the software, or the like. The information related to a component to be acquired may preferably be information on a component that may possibly be constraint when a system is changed.

The classifying unit 14 classifies the devices 12 into one or multiple device groups. For example, the classifying unit 14 calculates the similarity of each piece of information related to each of the components in the multiple devices 12 acquired from the acquiring unit 13 and then classifies, on the basis of the calculated similarity, the multiple devices 12 into one or multiple device groups. For example, the classifying unit 14 compares information related to the components in each of the devices 12 and then specifies a component in which the number of pieces of set information is small. Then, the classifying unit 14 specifies the device 12 with the small number of pieces of information that is set in the component as the device 12 in which an exceptional setting is performed and then classifies the specified device 12 in a device group.

At this point, in a large scale system, if the same task is performed on each of the devices 12 in order to change a system, a change in the system of a large number of devices 12 is successful. However, for some devices 12, because an exceptional setting is performed on a component and thus the condition for changing a system is not satisfied, there may be a case in which the system fails.

The update processing unit 15 performs a process for updating systems of the devices that are classified, by the classifying unit, into the same device group by using a method for updating a program commonly used. For example, the update processing unit 15 performs a process for updating systems of the devices 12, by using different control between the device 12, which is specified by the classifying unit 14 and in which the exceptional setting is performed, and the other devices 12. For example, the update processing unit 15 performs, on the other devices 12, a system change by using a semi automated method, such as a batch process. If there are the other multiple devices 12, for example, after the update processing unit 15 performs a system change on one of the devices 12 by using a semi automated method and then checks that no abnormality is present after the system change, the update processing unit 15 may continuously perform the system change on the other remaining devices 12. Consequently, for the other devices 12 that store therein a component in which an exceptional setting is not performed, the systems can be changed by reducing the burden placed on an administrator or the working hours.

In contrast, for the devices 12 in each of which an exceptional setting is performed, the update processing unit 15 changes systems while checking the state of the systems more frequently than the other devices 12 when the update process is performed on the systems. An example of a case in which the state of systems is frequently checked is a case in which the update processing unit 15 changes the systems while requesting an administrator to check a system every time a predetermined process, in an update process performed on the systems, in which an abnormality may possibly occur when the system is updated, such as when a modification program is applied or when a reboot is performed. Alternatively, in an update process performed on systems, the update processing unit 15 changes the systems by adding a predetermined process, such as an output of a log, a backup of the systems before an update, or the like. Specifically, a system update process is performed on the device 12, in which an exceptional setting is performed, while an administrator checking the state of the systems. Consequently, because the systems are carefully changed in the device 12 in each of which the exceptional setting is performed, the reliability of the change task performed on the systems can be improved.

In the example illustrated in FIG. 1, because the functional configuration is illustrated, the acquiring unit 13, the classifying unit 14, and the update processing unit 15 are separately illustrated; however, for example, they may also be integrated as a single device. An example of the device includes an electronic circuit, such as a central processing unit (CPU), a micro processing unit (MPU), or the like. Furthermore, an integrated circuit, such as an application specific integrated circuit (ASIC), a field programmable gate array (FPGA), or the like, may also be used as the device.

As described above, the update control device 10 acquires component information that indicates each of the components in each of the multiple devices 12. Furthermore, the update control device 10 calculates the similarity of each piece of the component information related to each of the acquired multiple devices 12 and then classifies, on the basis of the calculated similarity, the multiple devices 12 into a single or multiple device groups. Furthermore, the update control device 10 performs, on the devices classified into the same device group, the system updating process by using a method for updating a commonly used program. Consequently, with the update control device 10, even if an administrator does not grasp all the constraint related to the change in systems, the systems can be updated by using a different control method on the device 12 in which an exceptional setting is performed on a component, which may cause a failure of the system change. As described above, with the update control device 10, for the device 12 in which an exceptional setting is performed on a component, the reliability of the change task performed on the systems can be improved by changing the control of the system update process and by carefully updating the system.

[b] Second Embodiment

Figure 2:
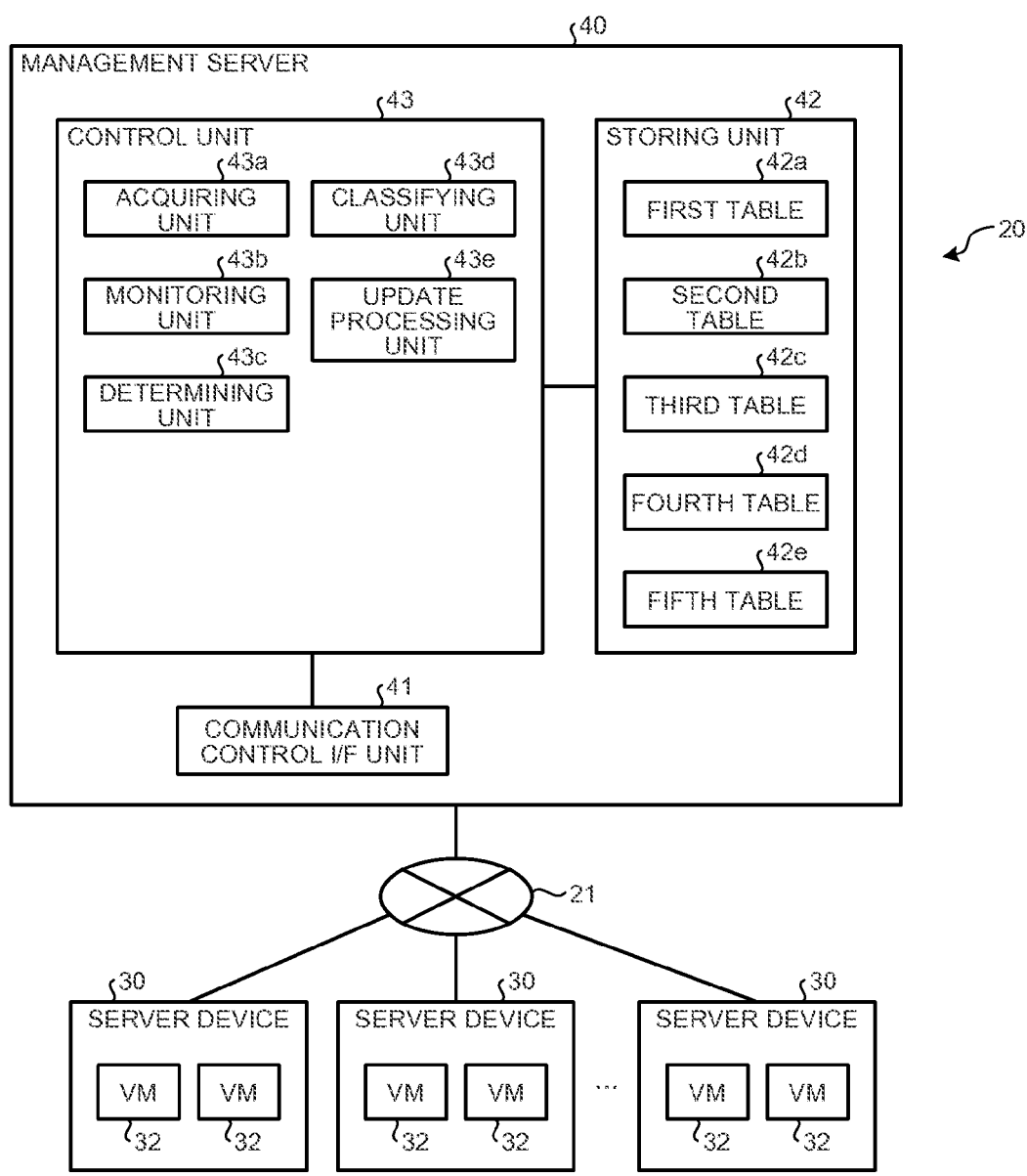
FIG. 2 is a schematic diagram illustrating an example of the functional configuration of a system according to a second embodiment.

In the following, a second embodiment will be described. In the second embodiment, a description will be given of a system 20 in which multiple virtual machines (VMs) 32 are running on each of server devices 30 and a management server 40 controls a change in systems of each server device 30. FIG. 2 is a schematic diagram illustrating an example of the functional configuration of a system according to a second embodiment. The system 20 includes the multiple server devices 30 and the management server 40. Each of the server devices 30 is connected to the management server 40 via a network 21 such that they communicate with each other. An example of the network 21 includes any kind of communication network, such as the Internet, a LAN, a VPN, or the like, irrespective of whether the network is wired or wireless.

Each of the server devices 30 operates the VMs 32 and operates a system running on each of the VMs 32. The management server 40 manages each of the server devices 30 and controls a change of a system of each of the server devices 30. FIG. 2 illustrates three server devices 30 as an example; however, an arbitrary number of the server devices 30 may be used. In the first embodiment, a description will be given with the assumption that 16 server devices 30, i.e., server devices 30a to 30p, are used.

Figure 3:
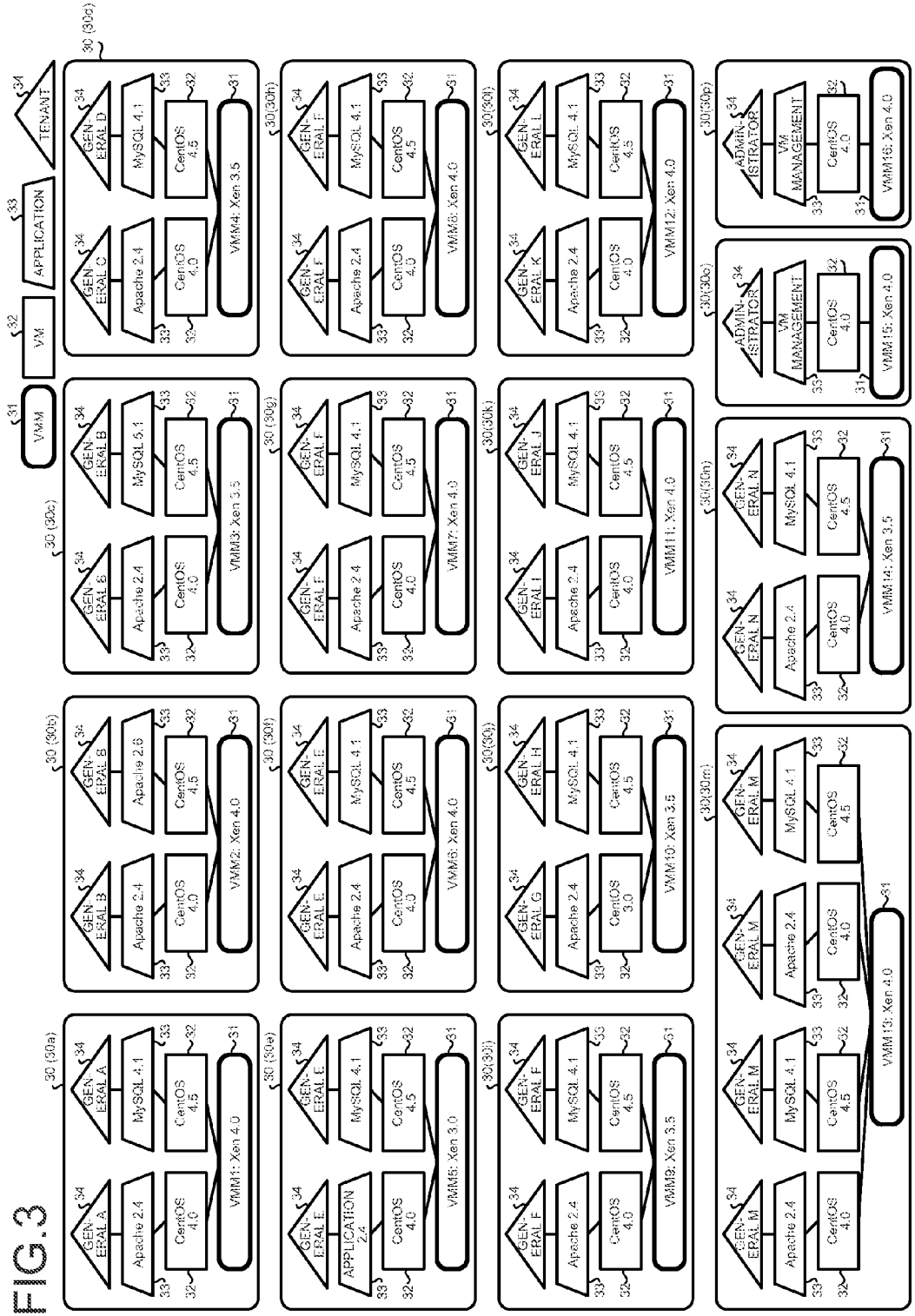
FIG. 3 is a schematic diagram illustrating an example of each server device.

FIG. 3 is a schematic diagram illustrating an example of each server device. Each of the server devices 30a to 30p operates one or multiple VMs 32 on a virtual machine monitor (VMM) 31 and operates various kinds of applications 33 on the VMs 32. These various kinds of applications 33 are used by tenants 34. Examples of the tenants 34 include general users, such as users or business persons, or administrators of the system 20.

VMM 31 is virtualization software, which virtually implements an operating environment of a computer system, and controls of the operation of the VMs 32. Furthermore, the VMM 31 controls the updating of a system in accordance with a system update instruction received from the management server 40. Furthermore, the VMM 31 performs the migration of the VMs 32 with the other server devices 30 in accordance with a migration instruction received from the management server 40. The example illustrated in FIG. 3 indicates that "Xen" is running as the VMM 31 in each of the server devices 30a to 30p. One of the symbols of "VMM1" to "VMM16" represented in the VMMs 31 indicates the ID that identifies the VMMs 31. The number represented next to "Xen" in each of the VMMs 31 indicates the version of the virtualization software. The example illustrated in FIG. 3 indicates that Xen with the version of 4.0 is operated as the VMM 31 in the server device 30a.

The VMs 32 are virtual machines that execute a process provided to the tenant 34 in an environment that is provided by the VMMs 31. Each of the VMs 32 executes a process of the corresponding application 33 in a virtual environment. The example illustrated in FIG. 3 indicates that the VMs 32 are running on the VMMs 31 in the server devices 30a to 30p. The number represented next to "CentOS" in each of the VMs 32 indicates the version of a client OS. For example, in the server device 30a, the client OS with the version of 4.0 and the client OS with the version of 4.5 are running as the VMs 32.

Furthermore, the example illustrated in FIG. 3 indicates that Apache and MySQL are running as the applications 33 on the VMs 32 in the server devices 30a to 30p. The number represented next to each of the "Apache" and "MySQL" of the applications 33 indicates the version of the application 33. For example, the example illustrated in FIG. 3 indicates that, in the server device 30a, Apache 2.4 is running as the application 33 on the client OS with the version of 4.0 and MySQL 4.1 is running as the application 33 on the client OS with the version of 4.5. Furthermore, the example illustrated in FIG. 3 indicates that both Apache and MySQL running on the server device 30a are used by a general user A.

A description will be given here by referring back to FIG. 2. The management server 40 includes a communication control I/F unit 41, a storing unit 42, and a control unit 43.

The communication control I/F unit 41 is an interface that includes at least a single port and that controls communication between each of the server devices 30 and the management server 40. The communication control I/F unit 41 sends and receives various kinds of information to and from each of the server devices 30. For example, the communication control I/F unit 41 receives information related to a component from each of the server devices 30. Furthermore, the communication control I/F unit 41 sends, to each of the server devices 30, various instructions to control a change of the system.

The storing unit 42 stores therein various kinds of information. For example, the storing unit 42 stores therein a first table 42a, a second table 42b, a third table 42c, a fourth table 42d, and a fifth table 42e. The pieces of data stored in the first table 42a are registered by an acquiring unit 43a, which will be described later. In contrast, the pieces of data stored in the second table 42b to the fifth table 42e are registered via a terminal device, such as a client computer that can be communicated with the management server 40 by an administrator of the system 20, or via an input device, such as a mouse or a keyboard provided in the management server 40. Example devices of the storing unit 42 include a semiconductor memory capable of rewriting data, such as a flash memory, a non-volatile static random-access memory (NVSRAM), and the like, or a storage device, such as a hard disk, an optical disk, or the like.

The first table 42a is a table that manages information related to components in each of the server devices 30. FIG. 4 is a schematic diagram illustrating an example configuration of data in a first table. As illustrated in FIG. 4, the first table 42a includes therein items, such as the target ID, the target type, the number of VMs, the VM type, the number of applications, the application type, the number of tenants, the tenant type, and the tenant owner. FIG. 5 is a schematic diagram illustrating the association relationship between information related to components in a server device and each item in the first table. The item of the target ID is an area that stores therein the ID of the VMM 31 running of the server device 30. The item of the target type is an area that stores therein the name and the version of the software of the VMM 31 running in the server device 30. The item of the number of VMs is an area that stores therein the number of VMs 32 running on the VMM 31. The item of the VM type is an area that stores therein the name and the version of the client OS of VM 32 running on the VMM 31. The item of the number of applications is an area that stores therein the number of applications 33 running on the VM 32. The item of the application type is an area that stores therein the application name and the version of the application 33 running on the VM 32. The item of the number of tenants is an area that stores therein the number of tenants 34 in the VM 32. The item of the tenant type is an area that stores therein information indicating whether the tenant 34 is a general user or an administrator. The item of the tenant owner is an area that stores therein information indicating the tenant 34.

The examples illustrated in FIGS. 4 and 5 indicate that, in the server device 30e, the ID of the VMM 31 is "VMM5" and the VMM 31 is "Xen3.0". Furthermore, the examples illustrated in FIGS. 4 and 5 indicate that, in the server device 30e, the number of VMs 32 running on the VMM 31 is "2" and two VMs 32 are used as "CentOS" with each of the versions of "4.0" and "4.5". Furthermore, the examples illustrated in FIGS. 4 and 5 indicate that, in the server device 30e, the number of the applications 33 running on the VM 32 is "2" and the two applications 33 are "Apache 2.4" and "MySQL 4.1". Furthermore, the examples illustrated in FIGS. 4 and 5 indicate that, in the server device 30e, the number of the tenants 34 is "1", the type of the tenant 34 is a general user, and the tenant 34 is "E".

The second table 42b is a table that manages the registered workflow. FIG. 6 is a schematic diagram illustrating an example configuration of data in a second table. As illustrated in FIG. 6, the second table 42b includes therein items, such as the workflow ID and the content. The item of the workflow ID is an area that stores therein identification information that is used to identify the workflow. The item of the content is an area that stores therein information indicating the content of the process of the workflow.

The example illustrated in FIG. 6 indicates that a modification program is used for the workflow with the workflow ID of "WF-01" and indicates that the content of the process of the workflow with the workflow ID of "WF-02" is migration.

The third table 42c is a table that manages each of the processes of the workflow. FIG. 7 is a schematic diagram illustrating an example configuration of data in a third table. As illustrated in FIG. 7, the third table 42c includes therein items, such as the operation ID, the content, the command definition, the subsequent process performed after a success, the subsequent process performed after a failure. The item of the operation ID is an area that stores therein the ID for identifying each workflow process. In the example illustrated in FIG. 7, the operation ID is created by adding the workflow ID of the workflow to a "—sub number". The item of the content is an area that stores therein information indicating the processed content of the process performed on a workflow. The item of the command definition is an area that stores therein a command with which each process is performed on a workflow. The item of the subsequent process performed after a success is an area that stores therein the operation ID that is used to identify a subsequent process performed after the immediately previous process has been successful. The item of the subsequent process performed after a failure is an area that stores therein the operation ID that is used to identify a subsequent process performed after the immediately previous process has been failed.

The example illustrated in FIG. 7 indicates an example of each of the workflow processes performed on the workflow ID with the "WF-01" illustrated in FIG. 6. The workflow illustrated in FIG. 7 indicates the flow of each process used in a modification program. In the example illustrated in FIG. 7, the record with the operation ID of "WF-01-1" indicates a process to be performed for the first time when the workflow is performed and indicates that the subsequent process is "WF-01-2". The record with the operation ID of "WF-01-2" indicates a login to the server device 30, in which a system is to be changed, by executing the command of "ssh XXXX" and indicates that the subsequent process is "WF-01-3". The command of "XXXX" is changed in accordance with the target for a change. The record with the operation ID of "WF-01-3" indicates a backup of the VM 32 by executing the command of "vm-snapshot" and indicates that the subsequent process is "WF-01-4". The record with the operation ID of "WF-01-4" indicates that a modification program is applied by executing the command of "patch YYY"; indicates that the subsequent process is "WF-01-5" when the process has been successful; and indicates that the subsequent process is "WF-01-8" when the process has been failed. Furthermore, the command of "YYY" is changed in accordance with the modification program to be applied. The record with the operation ID of "WF-01-5" indicates a reboot of the server device 30 by the command of "shutdown —r" being executed and indicates that the subsequent process is "WF-01-6". The record with the operation ID of "WF-01-6" indicates an operation check of the server device 30 by the command of "http://xxx . . . " being executed; indicates that the subsequent process is "WF-01-7" when the operation state is normal; and indicates that the subsequent process is "WF-01-8" when the operation state is abnormal. Furthermore, the command of "xxx . . . " is changed in accordance with the content of the operation check. The record with the operation ID of "WF-01-7" indicates a log out from the server device 30 by executing the command of "exit" and indicates that the subsequent process is "WF-01-10". The record with the operation ID of "WF-01-8" indicates a process for restoring data to the backed up VM 32 by executing the command of "vm-revert" and indicates that the subsequent process is "WF-01-9". The record with the operation ID of "WF-01-9" indicates a report of the occurrence of an abnormality to an administrator by using an e-mail by executing the command of "mail" and indicates that the subsequent process is "WF-01-10". The record with the operation ID of "WF-01-10" indicates the end of the workflow.

FIG. 8 is a schematic diagram illustrating the flow of the workflow that uses the modification program illustrated in FIG. 7. In the example illustrated in FIG. 8, the operation ID associated with each of the processes illustrated in FIG. 7 is attached to each process of the workflow. As illustrated in FIG. 8, in the workflow that uses the modification program, if the modification program can be used normally, the flow of the processes performed in the order of "start", "login", "backup", "applying of a patch", "reboot", "operation check", "log out", and "end". In contrast, for the workflow that uses a modification program, if an abnormality is detected in a process of "applying of a patch" or an "operation check", the flow of the processes performed in the order of "restoration", "report", "log out", and "end".

The fourth table 42d is a table that manages the execution condition of the workflow. FIG. 9 is a schematic diagram illustrating an example configuration of data in a fourth table. As illustrated in FIG. 9, the fourth table 42d includes therein items, such as the instance ID, the start date and time, the execution workflow, and the execution target definition. The item of the instance ID is an area that stores therein the ID of an instance of the workflow when the workflow is executed. The item of the start date and time is an area that stores therein the start date and time at which a workflow is executed. The item of the execution workflow is an area that stores therein the workflow ID of the workflow to be executed. The item of the execution target definition is an area that stores therein the condition of the target process performed on a workflow.

The example illustrated in FIG. 9 indicates that the workflow with the workflow ID of "WF-01" is executed at the date and time, i.e., 2011/4/15 at 3:00, and indicates that the ID of the instance to be executed is "WF_patch_20110415". Furthermore, the example indicates that, for the workflow with the workflow ID of "WF-01", the application to which a patch is to be applied is "Apache" and the modification program to be used is "patch-0.5.1.2". Furthermore, the example indicates that, for the workflow with the workflow ID of "WF-01", the servers to be used are the server devices 30a to 30p.

The fifth table 42e is a table for managing the control condition of the change target that corresponds to an exception. FIG. 10 is a schematic diagram illustrating an example configuration of data in a fifth table. As illustrated in FIG. 10, the fifth table 42e includes therein items, such as the instance ID and the control condition. The item of the instance ID is an area that stores therein the ID of an instance of a workflow of the control that is performed in accordance with the control condition. The item of the control condition is an area that stores therein the control condition for the change target in which an exceptional setting is performed.

The example illustrated in FIG. 10 indicates that, for the workflow with the instance ID of "WF_patch_20110415", in a process performed on a workflow, a step execution is performed on the change target that corresponds to an exception.

A description will be given here by referring back to FIG. 2. The control unit 43 is, for example, an electronic circuit, such as a CPU that includes an internal memory or the like, and includes the acquiring unit 43a, a monitoring unit 43b, a determining unit 43c, a classifying unit 43d, and an update processing unit 43e.

The acquiring unit 43a communicates with each of the server devices 30 via the communication control I/F unit 41 and acquires information related to components from each of the server devices 30. The acquiring unit 43a stores the information related to the acquired components in the first table 42a in the storing unit 42. Alternatively, for example, the acquiring unit 43a may also acquire the information related to the components received from each of the server devices 30 by using a method as follows. Namely, the management server 40 requests each of the server devices 30 to send the information related to the components and then the acquiring unit 43a receives the information related to the components from each of the server devices 30. Furthermore, each of the server devices 30 sends the information related to the components to the management server 40 at predetermined intervals and then the management server 40 receives the information related to the components, whereby the acquiring unit 43a may also acquire the information related to the components received from each of the server devices 30.

The monitoring unit 43b periodically monitors the start date and time stored in the fourth table 42d in the storing unit 42 and determines whether the workflow to be processed at the start date and time is present. If the workflow that is determined to be processed at the start date and time is present, the monitoring unit 43b notifies the determining unit 43c of it.

The determining unit 43c reads, from the item of the execution target definition in the fourth table 42d in the storing unit 42, the condition for the process target of the workflow that is determined to be processed at the start date and time by the monitoring unit 43b. The determining unit 43c specifies the server device 30 that satisfies the condition of the process target from the first table 42a and then reads the information related to the components in each of the server devices 30 that satisfies the condition for the process target. For example, if it is determined that the workflow with the workflow ID of "WF-01" illustrated in FIG. 9 is at the start date and time, the determining unit 43c reads the information related to the components of the server devices 30a to 30p from the first table 42a.

For the information related to the components of each of the server devices 30 read by the determining unit 43c, the classifying unit 43d determines, for each component, whether the information is the majority or the minority. The determination of the majority and the minority performed for each component is performed by using, for example, the following method. For the information related to the components in each of the server devices 30, the classifying unit 43d calculates a value that indicates the degree of exception by using a value such that a larger value is used as the information becomes rare. The value indicating the degree of exception is calculated from, for example, the information volume I related to a component and the average information volume H of the components as follows. At this point, if the number of samples of information related to a component is represented by m and the number of target components in each of which specific information is set is represented by n, a probability P of specific information being set in components in each of the server devices 30 can be obtained from equation (1) below:

$$P = n/m \quad (1)$$

In this case, the information volume I of the specific information and the average information volume H are calculated from equations (2) and (3) below:

$$\text{Information volume } I = -\log(p) \quad (2)$$

$$\text{Average information volume } H = \quad (3)$$
$$-\sum_{i=1}^{N} p_i \log(p_i)(p_1 + p_2 + \ldots + p_N = 1)$$

As indicated by equation (4), the value indicating the degree of exception is calculated by dividing the information volume I by the average information volume H.

$$\text{Degree of exception} = I/H \quad (4)$$

For example, it is assumed that, from among 100 VMMs 31, a single VMM 31 is Xen4.0 and 99 VMMs 31 are Xen3.5. In such a case, information volume IXen4.0 of the VMM 31 in which Xen4.0 is used, the information volume IXen3.5 of the VMM 31 in which Xen3.5 is used, and the average information volume H are calculated by using equations (5) to (7) below:

$$I_{Xen4.0} = -\log\left(\frac{1}{100}\right) = 6.64 \quad (5)$$

$$I_{Xen3.5} = -\log\left(\frac{99}{100}\right) = 0.0145 \quad (6)$$

$$H = -\frac{1}{100}\log\left(\frac{1}{100}\right) - \frac{99}{100}\log\left(\frac{99}{100}\right) = 0.08 \quad (7)$$

Consequently, the value indicating the degree of exception about Xen4.0 becomes IXen4.0/H=82.2. In contrast, the value indicating the degree of exception about Xen3.5 becomes IXen3.5/H=0.18.

Furthermore, for example, it is assumed that a different IP address is allocated to each of the 100 VMMs 31. In such a case, the information volume I and the average information volume H are calculated by using equations (8) and (9) below:

$$I_{192.168.0.1} = -\log\left(\frac{1}{100}\right) = 6.64 \quad (8)$$

$$H = -\frac{1}{100}\log\left(\frac{1}{100}\right) \times 100 = 6.64 \quad (9)$$

Consequently, the value indicating the degree of exception is I/H=1.

At this point, a value of the information volume I becomes larger as the number of same information related to components decreases. However, for example, different information is set in a component, such as an IP address, it is hard to say that each piece of information is rare information. Accordingly, in the embodiment, a value obtained by dividing the information volume I by the average information volume H is used as a value that indicates the degree of exception. Consequently, for the information with the information volume I that is equal to or less than the average information volume H, the value, of that information, that indicates the degree of exception is equal to or less than 1. Furthermore, for the information with the information volume I that is equal or greater than the average information volume H, the value, of that information, that indicates the degree of exception is equal to or greater than 1. Consequently, as the value that indicates the degree of exception becomes larger, the information is determined to be rare. In the embodiment, a value obtained from I/H is used as the value that indicates the degree of exception; however, the embodiment is not limited thereto. For example, any method may also be used as long as a larger value can be obtained as information becomes rare.

FIG. 11 is a schematic diagram illustrating examples of the calculation results of I/H values that indicate the degree of exception of information related to each of the components illustrated in FIG. 4. The example illustrated in FIG. 11 also indicates, for each piece of information related to a component, the target type, the number of samples m, the number of sample types, the number of targets n, value of n/m, information volume I, and average information volume H.

The example illustrated in FIG. 11 indicates that, for the target information of "Xen3.0", the target type is "Xen", the number of samples m is "16", the number of sample types is "3", and the number of targets n is "1". Furthermore, for the target information of "Xen3.0", the value of n/m is "0.06", the information volume I is "4.00", the average information volume H is "1.20", and the value of I/H is "3.34".

The classifying unit 43d determines, on the basis of the value of I/H, whether information related to a component is the majority or the minority. For example, the classifying unit 43d determines, by using a predetermined threshold, whether the information is the majority or the minority. In the embodiment, if a value of I/H is equal to or greater than 2.0, it is determined that the information is the minority. In contrast, if a value of I/H is equal to or less than 2.0 I/H, it is determined that the information is the majority. The threshold used for determining whether information is the majority or the minority is not limited to the above example. A person that uses the management server 40 may arbitrarily set a value as long as the value is equal to or greater than 1. Furthermore, for the determination of the majority or the minority, for example, a method of clustering, such as a k-means clustering method, or a decision tree method, may also be used.

The example illustrated in FIG. 11 indicates that, if I/H is less than 2.0, the information is determined to be the majority, whereas, if I/H is equal to or greater than 2.0, the information is determined to be the minority. In the example illustrated in FIG. 11, the area of the target information related to the information that is determined to be the majority and the area of I/H that is determined to be the majority are represented by the dotted pattern. In the example illustrated in FIG. 11, "Xen3.0" is determined to be the minority, whereas "Xen3.5" and "Xen4.0" are determined to be the majority. Furthermore, the "number of VMs 1" and the "number of VMs of 4" are determined to be the minority, whereas the "number of VMs of 2" is determined to be the majority. Furthermore, "CentOS3.0" is determined to be the minority, whereas "CentOS4.0" and "CentOS4.5" are determined to be the majority. Furthermore, the "number of applications of 1" and the "number of applications of 4" is determined to be the minority, whereas the "number of applications of 2" is determined to be the majority. Furthermore, "Apache2.6" is determined to be the minority, whereas "Apache 2.4" is determined to be the majority. Furthermore, "MySQL5.1" and "VM management" is determined to be the minority, whereas "MySQL 4.1" is determined to be the majority. Furthermore, the "number of owners of 2" is determined to be the minority, whereas the "number of owners of 1" is determined to be the majority. Furthermore, "tenant management" is determined to be the minority, whereas "tenant general" is determined to be the majority. Furthermore, the tenants "A" to "N" and "administrator" are determined to be the majority.

FIG. 12 is a schematic diagram illustrating examples of the results of determining whether information related to the components in the first table illustrated in FIG. 4 is the majority or the minority. In the example illustrated in FIG. 12, the areas of the components determined to be the minority are represented by the dotted pattern. Furthermore, the example illustrated in FIG. 12 indicates, for the "number of the minorities", the number of components that are determined to be the minority. For example, for the server devices 30 each of which includes therein the VMM 31 with the ID of "VMM2" and "VMM3", because Apache 2.4 is determined to be the minority, the area of the application type is represented by the dotted pattern and the number of minorities is indicated by "1".

The classifying unit 43d counts, for each server device 30, the number of components that are determined to be the minority. Then, on the basis of the number of components that are determined to be the minority, the classifying unit 43d specifies the server device 30 in which the exceptional setting is performed. For example, the classifying unit 43d specifies, by using a predetermined threshold, the VMM 31 in which the exceptional setting is performed. In the embodiment, the classifying unit 43d specifies the server device 30 that includes therein three or more components that are determined to be the minority as the server device 30 in which the exceptional setting is performed. Furthermore, the threshold that is used to determine whether the exceptional setting is performed on the VMM 31 is not limited to this example. A person that uses the management server 40 may set any value.

Figure 13:
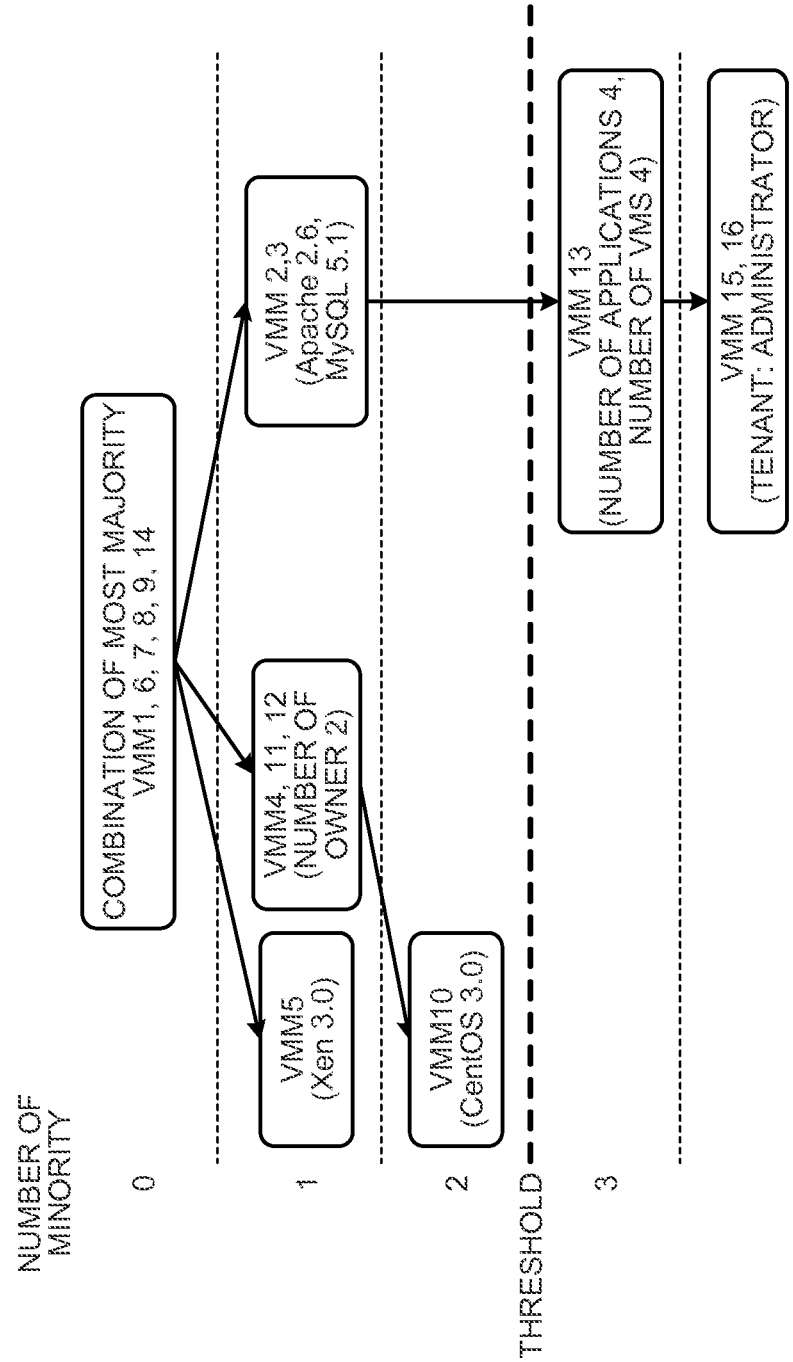
FIG. 13 is a schematic diagram illustrating examples of the results of classifying server devices by using a tree structure in accordance with the type and the number of components that are determined to be the minority.

FIG. 13 is a schematic diagram illustrating examples of the results of classifying server devices by using a tree structure in accordance with the type and the number of components that are determined to be the minority. FIG. 13 indicates the classification results of the server devices 30 by using the IDs of the VMM 31. In the example illustrated in FIG. 13, because the server devices 30 each of which includes therein the VMM 31 with one of the ID of "VMM1", "VMM6", "VMM7", "VMM8", "VMM9", and "VMM14" do not have any component that is determined to be the minority, the VMMs 31 with the subject IDs are classified at the location of "0" where the components that are determined to be the minority are located. Furthermore, for the server devices 30 each of which includes therein the VMM 31 with one of the ID of "VMM 4", "VMM11", and "VMM12", because the components that are determined to be the minority both indicate that the "number of owners is 2" and the number of components that are determined to be the minority is 1, the VMMs 31 with the subject IDs are classified at the location, as in the same group, indicated by the number of minorities of "1". Furthermore, for the server device 30 that includes therein the "VMM10", because the component determined to be the minority indicates that the "number of owner is 2" and "CentOS3.0" and the number of components determined to be the minority is 2, the "VMM10" is classified at the location in which the number of minorities is "2". Furthermore, for the server device 30 that includes therein the "VMM10", because the component that indicates that the "number of owner is 2" is the same group to which the "VMM4", the "VMM11", and the "VMM12" belongs, the "VMM10" is indicated at the location branched from the group to which the "VMM4", the "VMM11", and the "VMM12" belongs. In the example illustrated in FIG. 13, for the server devices 30 each of which includes therein the VMM 31 with one of the ID of the "VMM13", the "VMM15", and the "VMM16", because the number of components that are determined to be the minority is equal to or greater than 3, they are specified as the server device 30 in which an exceptional setting is performed.

Figure 14:
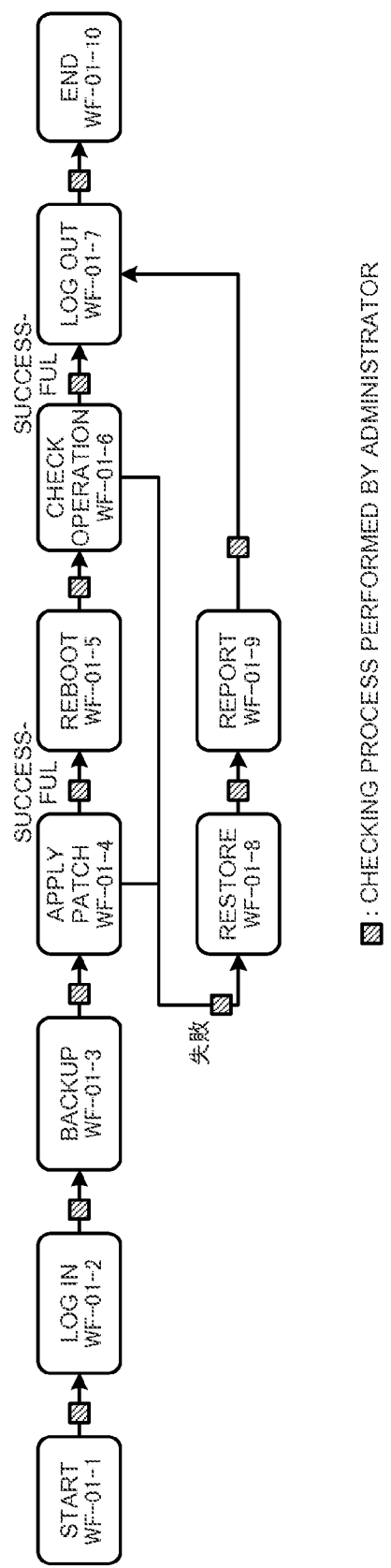
FIG. 14 is a schematic diagram illustrating the flow of an exceptional workflow.

The update processing unit 43e refers to the execution workflow stored in the fourth table 42d in the storing unit 42 and specifies the instance ID and the workflow ID of the workflow that is determined, by the monitoring unit 43b, to be started indicated by the start date and time. The update processing unit 43e reads, from the third table 42c in the storing unit 42, each of the processes performed on the workflow of the specified workflow ID. The update processing unit 43e determines that the process to be performed on the workflow that is read from the third table 42c is the normal workflow process. Furthermore, the update processing unit 43e reads, from the fifth table 42e in the storing unit 42, the control condition that is associated with the specified instance ID. In accordance with the control condition read from the fifth table 42e, the update processing unit 43e updates the normal workflow process and creates an exceptional workflow. For example, it is assumed that the workflow with the specified workflow ID is the workflow illustrated in FIG. 8 and it is assumed that the control condition is the control condition for the instance ID of "WF_patch_20110415" illustrated in FIG. 9. In such a case, the update processing unit 43e creates an exceptional workflow for performing step execution by adding a checking process that is to be performed, by an administrator, on each workflow illustrated in FIG. 8. FIG. 14 is a schematic diagram illustrating the flow of an exceptional workflow. In the example illustrated in FIG. 14, a checking process is added to each of the processes performed on the workflows illustrated in FIG. 9.

The update processing unit 43e determines the order of the workflow processes in the order the number of components that are determined to be the minority is small. In the embodiment, if there is the same number of components that are determined to be the minority, the process is to be performed from the VMM 31 with the smaller ID; however, the condition for the processing order may also further be determined. The update processing unit 43e executes a normal workflow process on the VMM 31, in which an exceptional setting is not performed, in the server device 30 in the order of processes that are determined. Then, the update processing unit 43e executes an exceptional workflow process on the VMM 31, in which an exceptional setting is performed, in the server device 30.

Figures 15, 16:
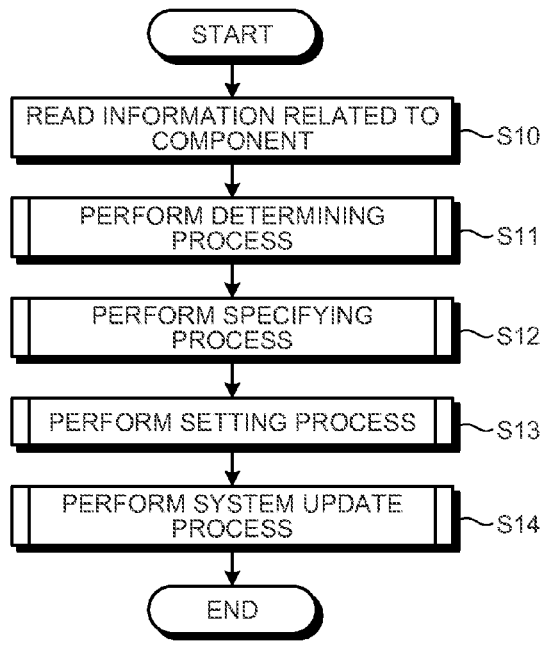
FIG. 15 is a schematic diagram illustrating the workflow performed on each VMM and illustrating the flow of a process of the workflow.
FIG. 16 is a flowchart illustrating the flow of an update control process.

FIG. 15 is a schematic diagram illustrating the workflow performed on each VMM and illustrating the flow of a process of the workflow. FIG. 15 illustrates the server devices 30 by using the IDs of the VMMs 31. The example illustrated in FIG. 15 indicates that the workflow with the workflow ID of "WF-01" is performed as the normal workflow on the server devices 30 with the ID of "VMM1" to "VMM12" and "VMM14". Furthermore, the normal workflow is sequentially performed on the server devices 30 with the ID of "VMM1", "VMM6" to "VMM 9" and "VMM14". Then, the normal workflow is sequentially performed on the VMM 31 with the ID of "VMM5", "VMM4", "VMM11", "VMM12", "VMM2", and "VMM3". Then, the normal workflow is performed on the VMM 31 with the ID of "VMM10".

Furthermore, the example illustrated in FIG. 15 indicates that an exceptional workflow, which is obtained by updating the normal workflow process, is performed on the VMM 31 with the ID of "VMM13", "VMM15", and "VMM16. The exceptional workflow is sequentially performed on the VMM 31 with the ID of "VMM13" and then performed on the VMM 31 with the ID of "VMM15" and "VMM16". As described above, because the system is carefully updated by performing the normal workflow process on the server device 30 and then performing the exceptional workflow process on the server device 30 in which an exceptional setting is performed, the reliability of the change task performed on the systems can be improved.

Furthermore, the update processing unit 43e performs a process for updating the system of each of the server devices 30 in the order the number of components determined to be the minority is small. If an abnormality occurs when an update is performed on a system of one of the server devices 30, the update processing unit 43e stops to update the systems of the subsequent server devices 30. When the update processing unit 43e updates the system of each of the server devices 30 in the order the number of components determined to be the minority is small, the server devices 30 whose system is updated later are the server devices 30 in each of which an exceptional setting is performed. Consequently, if an abnormality occurs when a system of one of the server devices 30 is updated, by stopping the update of the systems of the subsequent server devices 30, it is possible to prevent an update of the system of the server device 30, in which an abnormality may possibly occur due to the update of the system.

In the following, a description will be given of the flow of a process in which the management server 40 according to the embodiment controls a system change targeted for a change in a system. FIG. 16 is a flowchart illustrating the flow of an update control process. The update control process is performed by, for example, the monitoring unit 43b when one of the workflows is determined to be started date and time.

As illustrated in FIG. 16, the determining unit 43c reads, from the fourth table 42d, the condition for the processing target for the workflow that is determined to be started date and time and then reads, from the first table 42a, information related to the component in the server device 30 that satisfies the condition for the processing target (Step S10). For information related to the component included in each of the read server devices 30, the classifying unit 43d performs the determining process for determining whether the information is the majority or the minority by comparing the information for each component (Step S11).

Figure 17:
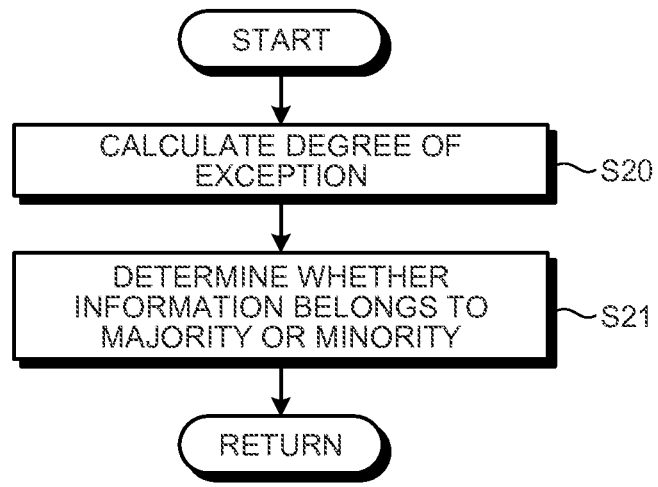
FIG. 17 is a flowchart illustrating the flow of a determining process.

FIG. 17 is a flowchart illustrating the flow of a determining process. The classifying unit 43d calculates a value that indicates the degree of exception related to information that is related to the component in each of the server devices 30 (Step S20). Then, on the basis of the value that indicates the calculated degree of exception, the classifying unit 43d determines, for each component, whether information is the majority or the minority (Step S21) and then proceeds to the process at Step S12 illustrated in FIG. 16.

Figure 18:
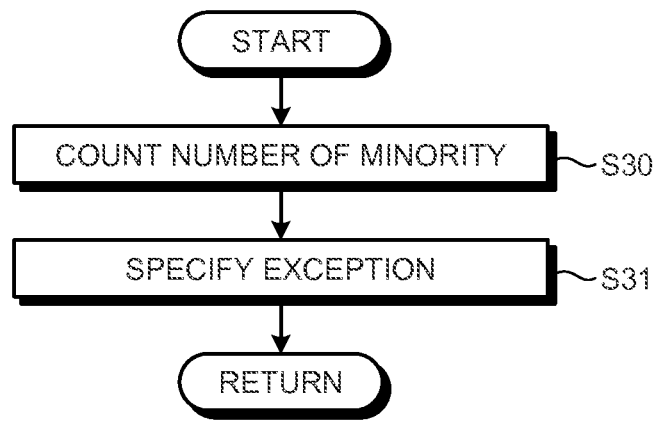
FIG. 18 is a flowchart illustrating the flow of a specifying process.

On the basis of the result of the determination performed for each component whether the information is the majority or the minority, the classifying unit 43d performs a specifying process that specifies the server device 30 in which an exceptional setting is performed (Step S12). FIG. 18 is a flowchart illustrating the flow of a specifying process. The classifying unit 43d counts, for each server device 30, the number of components determined to be the minority (Step S30). The classifying unit 43d specifies the server device 30 in which the number of components determined to be the minority is equal to or greater than a predetermined threshold as the server device 30 in which an exceptional setting is performed (Step S31) and then proceeds to the process at Step S13 illustrated in FIG. 16.

Figure 19:
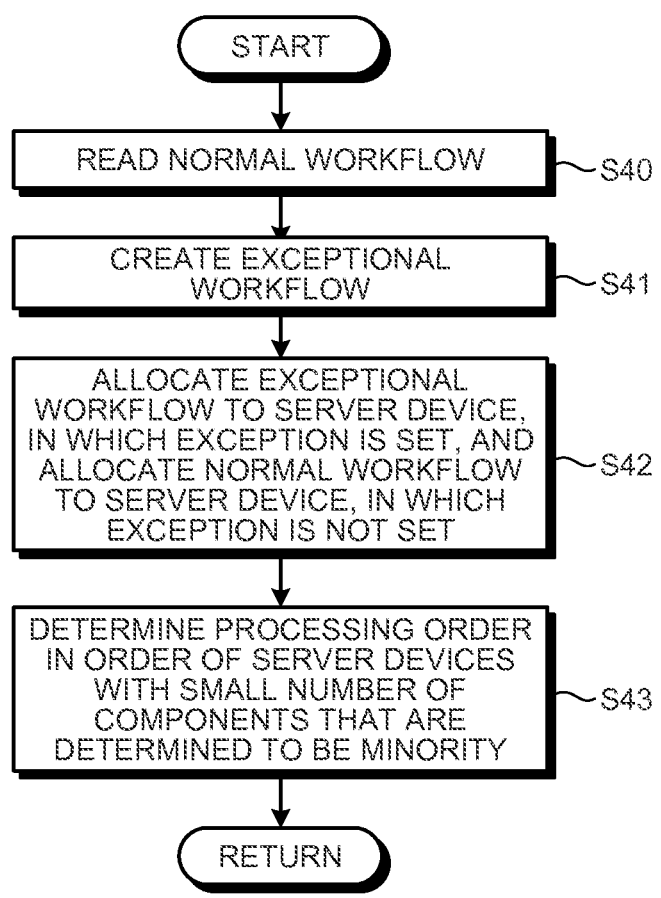
FIG. 19 is a flowchart illustrating the flow of a setting process.

The update processing unit 43e performs the setting process that sets the execution order of the workflows and the execution target for the workflow (Step S13). FIG. 19 is a flowchart illustrating the flow of a setting process. The update processing unit 43e reads, from the third table 42c, the process to be performed on the workflow, of the workflow ID, that is determined to be started date and time and determines that the process is a normal workflow process (Step S40). The update processing unit 43e reads, from the fifth table 42e, the control condition that is associated with the instance ID of the workflow that is determined to be the started date and time; updates, in accordance with the control condition, the normal workflow process; and then creates an exceptional workflow (Step S41). The update processing unit 43e allocates an exceptional workflow to the server device 30, in which an exceptional setting is performed, and then allocates a normal workflow to the server device 30, in which an exceptional setting is not performed (Step S42). The update processing unit 43e determines the order of the workflow processes that are sequentially performed on the server devices 30 in the order the number of components determined to be the minority is small (Step S43) and proceeds to the process at Step S14 in FIG. 16.

The update processing unit 43e performs the workflow process on the VMM 31 in the server device 30 in the determined order and then performs the system update process that updates systems (Step S14). FIG. 20 is a flowchart illustrating the flow of a system update process. The update processing unit 43e selects, in the order of the determined processes, server devices starting from the server device 30 in which an exceptional setting is not performed (Step S50). The update processing unit 43e performs the allocated normal workflow process on the VMM 31 in the selected server device 30 and then changes the system (Step S51). The update processing unit 43e determines whether the change in the system of the selected server device 30 has been successful (Step S52). If the change in the system has failed (No at Step S52), the update processing unit 43e notifies an administrator that the change in the system has failed (Step S53), returns to the update control process illustrated in FIG. 16, and ends the process. In contrast, if the change in the system has been successful (Yes at Step S52), the update processing unit 43e determines whether the change in systems has been completed for all of the server devices 30 in which an exceptional setting is not performed (Step S54). If the change in the systems has not been completed for all of the subject server devices 30 (No at Step S54), the process proceeds to Step S50. In contrast, if the change in the systems has been completed for all of the server devices 30 (Yes at Step S54), the update processing unit 43e selects, in the order of the determined processes, server devices starting from the server device 30 in which an exceptional setting is performed (Step S55). The update processing unit 43e performs, on the VMMs 31 in the selected server devices 30, each of the allocated exceptional workflow process and then performs the change in the systems (Step S56). The update processing unit 43e determines whether the change in the systems performed on the selected server devices 30 has been successful (Step S57). If the change in the systems has failed (No at Step S57), the update processing unit 43e proceeds to Step S53, notifies an administrator that the change in the systems has failed, returns to update control process illustrated in FIG. 16, and then ends the process. In contrast, if the change in the systems has been successful (Yes at Step S57), the update processing unit 43e determines whether the change in the systems has been completed for all of the server devices 30 in each of which an exceptional setting is performed (Step S58). If the change in the systems has not been completed for all of the subject server devices 30 (No at Step S58), the process proceeds to Step S55. In contrast, if the change in the systems has been completed for all of the subject server devices 30 (Yes at Step S58), the update processing unit 43e returns to the update control process illustrated in FIG. 16 and then ends the process.

As described above, the management server 40 determines, for each component, whether the information related to the component in each of the server devices 30 is the majority or the minority. Then, the management server 40 specifies the server device 30, in which the number of components determined to be the minority is equal to or greater than a predetermined threshold, as the server device 30 in which an exceptional setting is performed. Consequently, the management server 40 can determine the server device 30, in which the number of pieces of information related to a component that is determined to be the minority is large and the number of exceptional setting is large, as the server device 30 in which an exceptional setting is performed.

Furthermore, the management server 40 sequentially performs the process for updating systems in the order of the change targets in which the number of components that are determined to be the minority is small. Consequently, the management server 40 can update a system starting from the server device 30 in which the system can be stably updated.

Furthermore, if an abnormality occurs when a system of one of the server device 30 is updated, the management server 40 stops the update of the subsequent systems that are targeted for the change. Consequently, with the management server 40, an update of a system can be prevented for the server device 30 in which the abnormality may possibly occurs when the system is updated because the number of exceptional settings is greater than that in the server device 30 in which the abnormality has occurred.

[c] Third Embodiment

In the following, a third embodiment will be described. In the third embodiment, a description will be given of a case in which a change target, in which an exceptional setting is performed on the basis of a value that is obtained by adding a value that indicates the degree of exception for each component, is specified. The configuration of a system according to the third embodiment is substantially the same as that in the second embodiment illustrated in FIG. 2; therefore, differences between the second embodiment and the third embodiment will only be described below.

Similarly to the second embodiment, the classifying unit 43d calculates a value that indicates the degree of exception and determines, on the basis of the value that indicates the degree of exception, whether information related to a component is the majority or the minority. Then, the classifying unit 43d adds, for each server device 30, a value that indicates the degree of exception for each component that is determined to be the minority and then specifies, on the basis of the added value, the server device 30 in which an exceptional setting is performed. For example, the classifying unit 43d specifies, by using a predetermined threshold, the VMM 31 in which an exceptional setting is performed. In the embodiment, the classifying unit 43d specifies the server device 30, in which the additional value of the degree of exception for each component that is determined to be the minority is equal to or greater than 3, as the server device 30 in which an exceptional setting is performed. The threshold that is used to specify the VMM 31 in which the exceptional setting is performed is not limited to the example described above. For example, a person that uses the management server 40 may also arbitrarily set a value.

FIG. 21 is a schematic diagram illustrating an example of the results of classifying server devices by using a tree structure in accordance with the type and the additional value of the degree of exception of the components that are determined to be the minority. Furthermore, FIG. 21 indicates the classification results of the server devices 30 by using the ID of the VMM 31. Furthermore, in the example illustrated in FIG. 21, because the server devices 30 each of which includes therein the VMM 31 with one of the ID of "VMM1", "VMM6", "VMM7", "VMM8", "VMM9", and "VMM14" do not have a component that is determined to be the minority, the server devices 30 are classified at the position in which the additional value is "0". Furthermore, for the server devices 30 each of which includes therein the VMM 31 with one of the ID of "VMM4", "VMM11", and "VMM12", because the components that are determined to be the minority both indicate that the "number of owners is 2" and the value of I/H of the "number of owners of 2" is 2.47, they are classified at the location, as in the same group, between the additional values of "2" and "3". Furthermore, for the server device 30 that includes "VMM10", the components determined to be the minority are the "number of owner of 2" and "CentOS3.0", the values of I/H of the components are 2.47 and 3.34, and the additional value is 5.81. Consequently, the server device 30 that includes "VMM10" is classified at the location between the additional value of "5" and "6". Furthermore, for the server device 30 that includes "VMM10", the "number of owners of 2" is in common for the components, in the group of "VMM4", "VMM11", and "VMM12", that are determined to be the minority. Consequently, the server device 30 that includes "VMM10" is indicated by a structure branched off from the group of "VMM4", "VMM11", and "VMM12". In the example illustrated in FIG. 21, for the server devices 30 each of which includes therein the VMM 31 with one of the ID of "VMM10", "VMM13", "VMM15", "VMM16", because the additional value is equal to or greater than 3, they are specified as the server device 30 in which an exceptional setting is performed.

The update processing unit 43e determines workflow processes in the order of a smaller additional value of the degree of exception for each component that is determined to be the minority. In the embodiment, when the additional values are the same, the workflow process is performed starting from the VMM 31 having a smaller ID; however, a condition for the order of the processes may also further be defined. The update processing unit 43e performs, in the order that is determined, a normal workflow process on the VMM 31 in the server device 30 in which an exceptional setting is not performed. Then, the update processing unit 43e performs an exceptional workflow process on the VMM 31 in the server device 30 in which an exceptional setting is performed.

Furthermore, the update processing unit 43e performs a process for updating systems of the server devices 30 in the order the additional value is small. If an abnormality occurs when a system of one of the server devices 30 is updated, the update processing unit 43e stops to update the systems of the subsequent server devices 30.

As described above, the management server 40 calculates, for each component, a value that indicates the degree of exception related to information that is related to a component in each of the server devices 30. The value that indicates the degree of exception increases as information becomes rare. Then, the management server 40 specifies the change target, in which a value obtained by adding a value that indicates the degree of exception for each component that is determined to be the minority is equal to or greater than a predetermined threshold, as the change target in which the exceptional setting is performed. Consequently, with the management server 40, even if a single piece of the information related to a component is the minority, the information is rare. Thus, if the value of I/H is large, the subject server device 30 can be determined to be the server device 30 in which the exceptional setting is performed.

Furthermore, the management server 40 performs a process for updating systems in the order of the change targets with a smaller value to which a value of the degree of exception for each component that is determined to be the minority is added. The exceptional setting is performed on the server devices 30 as the additional value of the degree of exception for each component that is determined to be the minority increases. Consequently, with the management server 40, a system can be updated in the order of the server devices 30 in which the number of exceptional settings is small and the system thereof can be stably updated.

Furthermore, if an abnormality occurs when a system in one of the change targets is updated, the management server 40 stops to update the systems of the subsequent change targets. Consequently, with the management server 40, an update of a system can be prevented for the server device 30 in which the abnormality may possibly occurs when the system is updated because the number of exceptional settings is greater than that in the server device 30 in which the abnormality has occurred.

[d] Fourth Embodiment

In the above explanation, a description has been given of the embodiments of the device according to the present invention; however, the present invention can be implemented with various kinds of embodiments other than the embodiments described above. Therefore, another embodiment included in the present invention will be described below.

For example, in the embodiments, a description has been given of a case in which the server devices 30 are classified into two categories, i.e., the server devices 30 that are not exceptional servers and the server devices 30 that are exceptional servers, in accordance with the number of components that are determined to be the minority or the additional value of the degree of exception; however, the devices disclosed in the present invention are not limited thereto. For example, the server devices 30 may also be classified into three or more categories in accordance with the number of components that are determined to be the minority or the additional value of the degree of exception. FIG. 22 is a schematic diagram illustrating an example of the grouping condition when the server devices are classified into three categories in accordance with the additional value of the degree of exception and the definition of the workflow that is performed. In the example illustrated in FIG. 22, the server devices 30 with an additional value of the degree of exception being less than are classified into an almost secure group and then the systems thereof are updated by using a normal workflow. The server devices 30 with an additional value of the degree of exception being equal to or greater than 3 and being less than 10 are classified into a caution needed group and then the systems thereof are updated by using a reliable workflow in which a visual checking process performed by an administrator is added. The server devices 30 with an additional value of the degree of exception being equal to or greater than 10 are classified into a dangerous group and then the systems thereof are not updated. Instead of it, an administrator, such as a domain expert, checks the systems.

Figure 23:
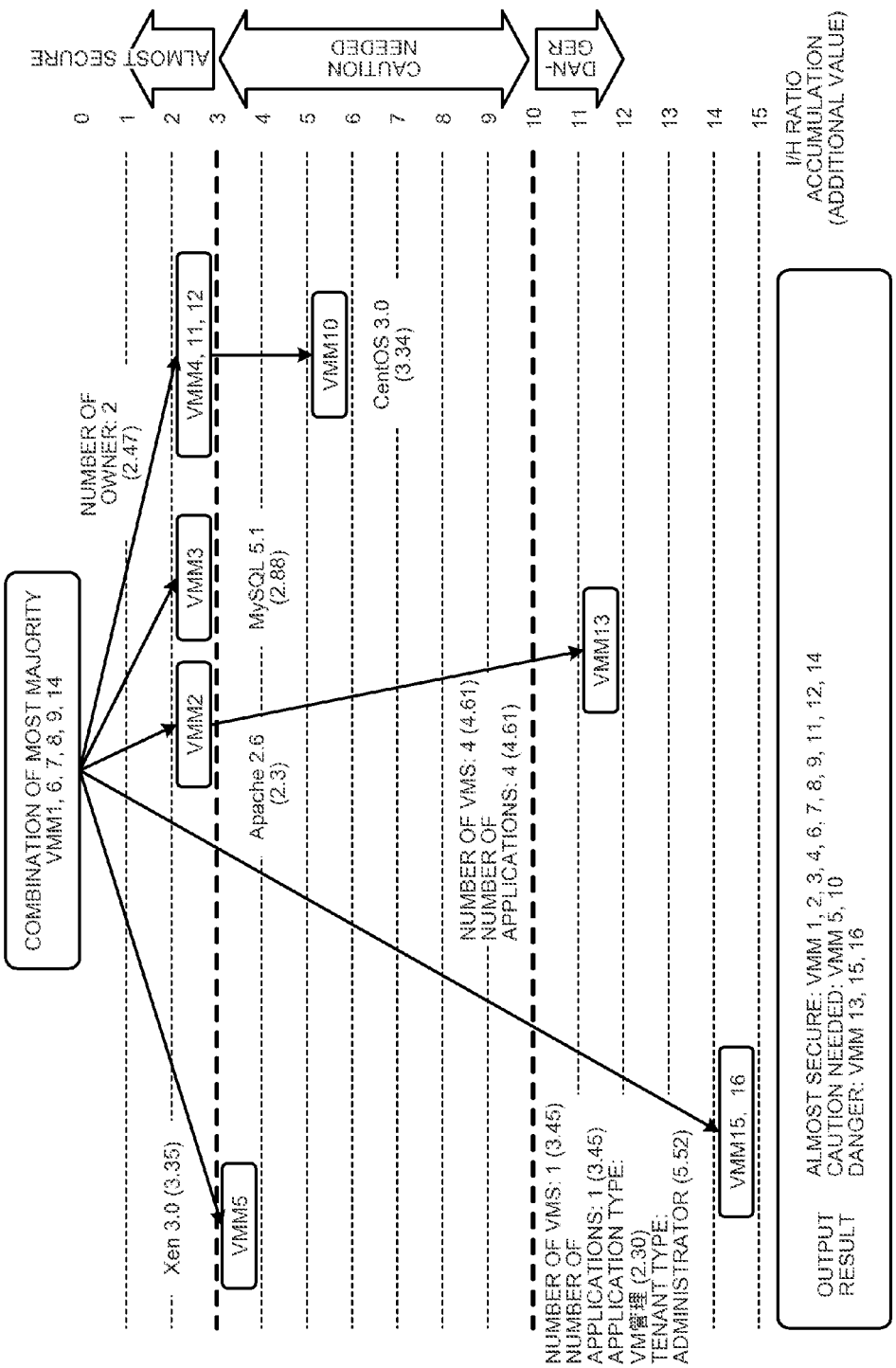
FIG. 23 is a schematic diagram illustrating an example of the results of classifying server devices by using a tree structure in accordance with the type and the additional value of the degree of exception of the components that are determined to be the minority.

FIG. 23 is a schematic diagram illustrating an example of the results of classifying server devices by using a tree structure in accordance with the type and the additional value of the degree of exception of the components that are determined to be the minority. Furthermore, FIG. 23 indicates the classification results of the server devices 30 by using the ID of the VMM 31. In the example illustrated in FIG. 23, for the server devices 30 each of which includes therein the VMM 31 with one of the ID of "VMM1" to "VMM 4", "VMM6" to "VMM 9", "VMM11", "VMM12", and "VMM14", because each of the additional values is less than 3, they are classified into the almost secure group. Furthermore, for the server devices 30 each of which includes therein the VMM 31 with one of the ID of "VMM 5" and "VMM10", because each of the additional values is equal to or greater than 3 and is less than 10, they are classified into the caution needed group. Furthermore, for the server devices 30 each of which includes therein the VMM 31 with one of the ID of "VMM13", "VMM15", and "VMM16", because each of the additional values is equal to or greater than 10, they are classified into the dangerous group.

As described above, because the process for updating the systems of the server devices 30, which are classified into each category, is performed by changing the control for each category, the reliability of the change task performed on the systems can be improved.

Figure 24:
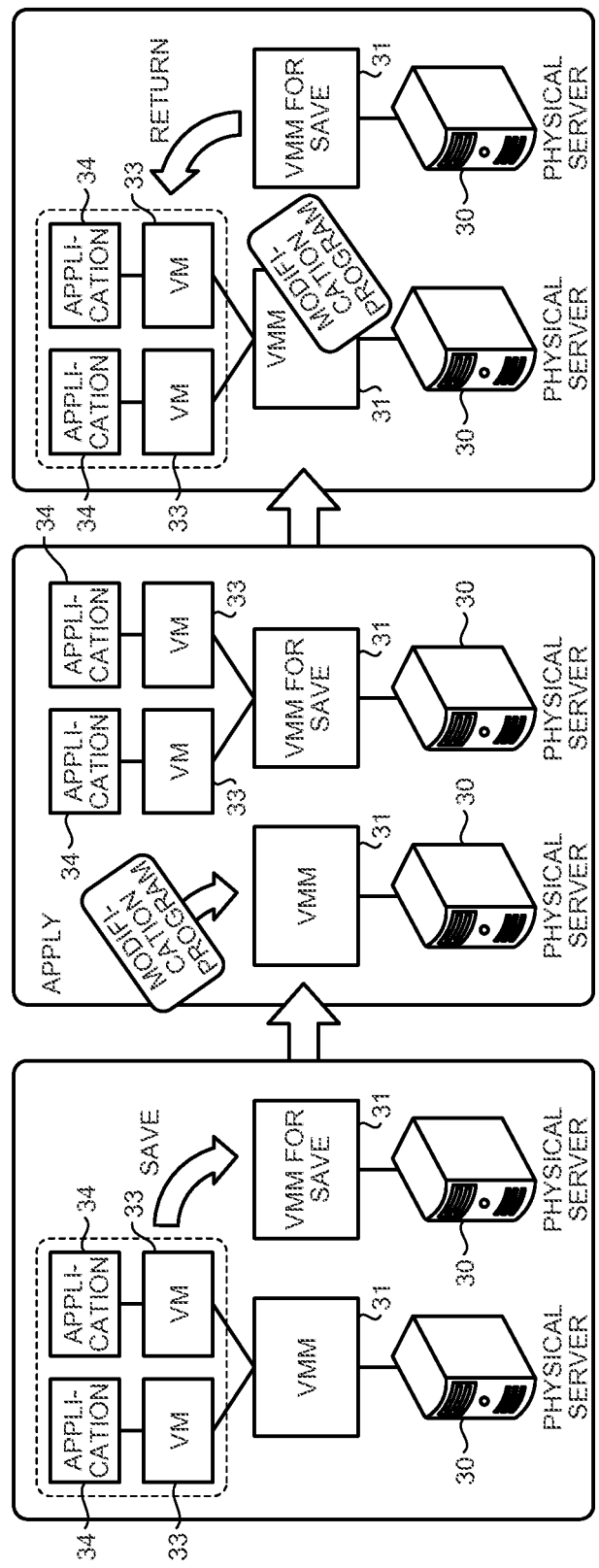
FIG. 24 is a schematic diagram illustrating the flow of updating the system.
Figure 25:
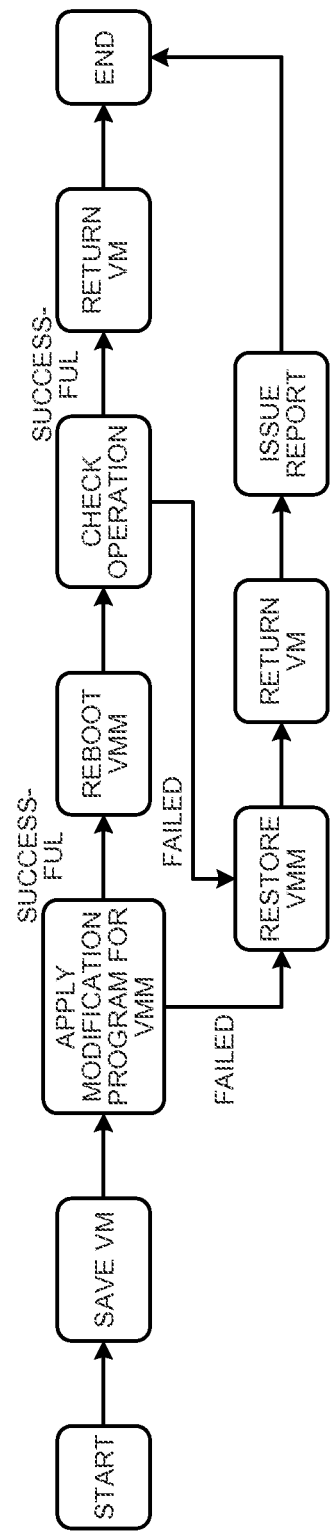
FIG. 25 is a schematic diagram illustrating an example of the flow of the workflow that uses a modification program.
Figure 26:
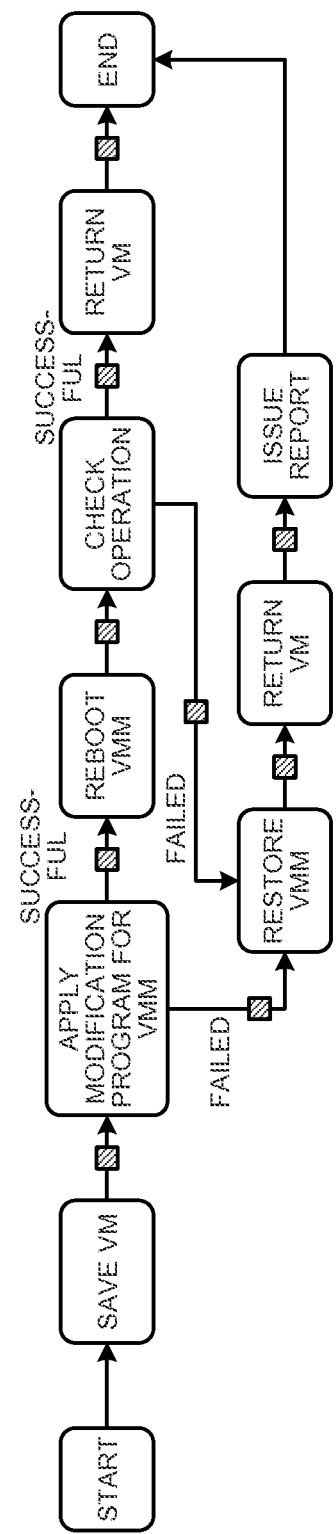
FIG. 26 is a schematic diagram illustrating the flow of an exceptional workflow that is created from the workflow illustrated in FIG. 25.

Furthermore, in the embodiments described above, as illustrated in FIGS. 6 and 7, a description has been given of a case in which, in the system update workflow, a system is temporarily stops in order to reboot the server device 30; however, the devices disclosed in the present invention are not limited thereto. For example, a system may also be updated after the VM 32 in the server device 30 that includes the system to be updated is saved by one of the other server devices 30. FIG. 24 is a schematic diagram illustrating the flow of updating the system. In the example illustrated in FIG. 24, after the VM 32 in the server device 30 that includes the system to be updated is migrated to the VMM 31, which is used for the save, in one of the other server devices 30, a modification program is applied and then the saved VM 32 is returned to the original server device 30. FIG. 25 is a schematic diagram illustrating an example of the flow of the workflow that uses a modification program. As illustrated in FIG. 25, for the workflow to which a modification program is applied, if the modification program can be applied normally, the workflow is performed in the order of "start", "save VM", "apply VMM modification program", "reboot VMM", "check operation", "return VM", and "end". In contrast, for the workflow to which a modification program is applied, if an abnormality is detected at the step of "apply VMM modification program" or "check operation", the workflow is performed in the order of "restore VMM", "return VM", "issue report", and "end". An exceptional workflow is created by updating the workflow illustrated in FIG. 25 in accordance with the control condition. For example, if the control condition is determined to be added to each of the process as a checking process, the checking process is added to each of the process of the workflow. FIG. 26 is a schematic diagram illustrating the flow of an exceptional workflow that is created from the workflow illustrated in FIG. 25. In the example illustrated in FIG. 26, a checking process is added to each of the processes of the workflow illustrated in FIG. 25.

The components of each device illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the processing unit, i.e., the acquiring unit 43a, the monitoring unit 43b, the determining unit 43c, the classifying unit 43d, and the update processing unit 43e illustrated in FIG. 2 may also be integrated as needed. Furthermore, all or any part of the processing functions performed by each device can be implemented by a CPU and by programs analyzed and executed by the CPU or implemented as hardware by wired logic.

Update Control Program

Figure 27:
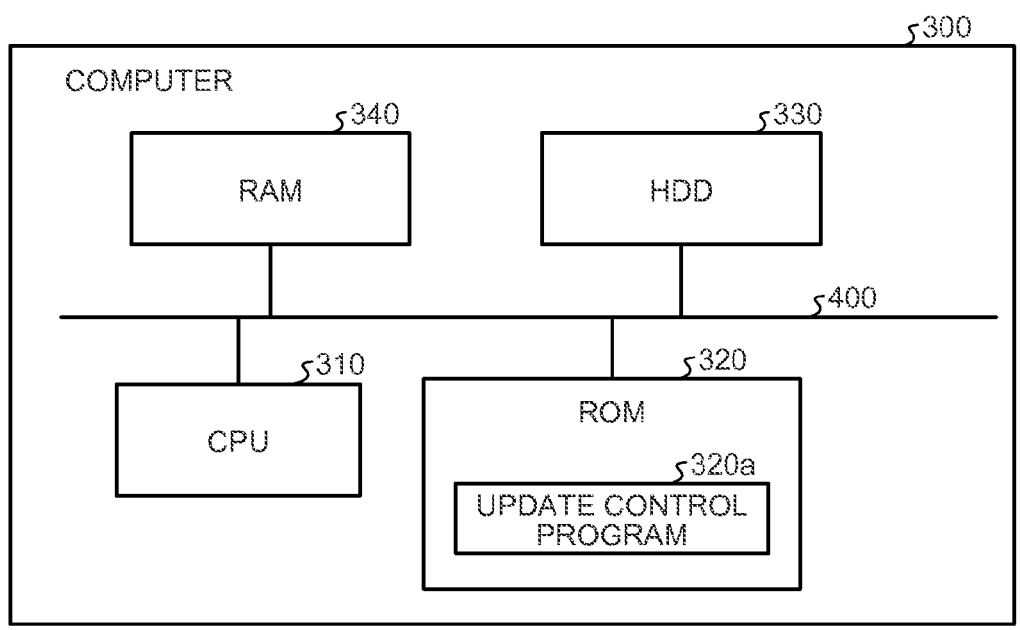
FIG. 27 is a block diagram illustrating a computer that executes an update control program.

Furthermore, various processes described in the above embodiments can be implemented by a program prepared in advance and executed by a computer system, such as a personal computer or a workstation. Accordingly, in the following, a description will be given of an example of a computer system that executes a program having the same function as that performed in the embodiments described above. FIG. 27 is a block diagram illustrating a computer that executes an update control program.

As illustrated in FIG. 27, a computer 300 includes a central processing unit (CPU) 310, a read only memory (ROM) 320, a hard disk drive (HDD) 330, and a random access memory (RAM) 340. The units 300 to 340 are connected with each other via a bus 400. The HDD 330 stores therein a table having the same function as that in the first table 42a to the fifth table 42e illustrated in FIG. 2.

The ROM 320 stores therein, in advance, an update control program 320a that is the same function as that performed by the acquiring unit 13, the classifying unit 14, and the update processing unit 15 described in the first embodiment or performed by the acquiring unit 43a, the monitoring unit 43b, the determining unit 43c, the classifying unit 43d, and the update processing unit 43e described in the second and the third embodiments. The update control program 320a may also be appropriately separated.

Then, the CPU 310 reads the update control program 320a from the ROM 320 and executes the program so that the update control program 320a executes the same operation as that executed by each of the control units described in the first to the third embodiments. Specifically, the update control program 320a executes the same operation as that executed by the acquiring unit 13, the classifying unit 14, and the update processing unit 15 described in the first embodiment or executed by the acquiring unit 43a, the monitoring unit 43b, the determining unit 43c, the classifying unit 43d, and the update processing unit 43e described in the second embodiment.

Furthermore, the update control program 320a described above is not always needed to be initially stored in the HDD 330.

For example, the program is stored in a "portable physical medium", such as a flexible disk (FD), a CD-ROM, a DVD disk, a magneto-optic disk, an IC CARD, or the like, that is to be inserted into the computer 300. Then, the computer 300 may read and execute the program from the portable physical medium.

Alternatively, the program may also be stored in "another computer (or a server)" connected to the computer 300 via a public circuit, the Internet, a LAN, a WAN, or the like. Then, the computer 300 may also read and execute the program from the other computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An update control device comprising:
a processor, wherein the processor executes a process comprising:
acquiring component information that indicates each of components in multiple devices;
calculating the similarity of each piece of the component information related to each of the multiple devices acquired by the acquiring and classifying, on the basis of the calculated similarity, the multiple devices into one or multiple device groups, wherein the classifying determines, for each component, whether the information related to each of the components in the multiple devices is the majority or the minority, specifies a device, in which the number of components determined to be the minority is equal to or greater than a predetermined threshold, as a device in which an exceptional setting is performed, and classifies the specified device in the one or one of the multiple device groups; and
performing, by using a common method for updating software, a process for updating software running on devices that are classified into the same device group, wherein
the performing performs the process for updating software running on devices in the order of the devices that have a smaller number of components that are determined to be the minority or in the order of the devices that have a smaller value that is obtained by adding the value that indicates the degree of exception for each component that is determined to be the minority, and
when an abnormality occurs when software running on one of the devices is updated, the performing stops to update software running on subsequent devices.

2. The update control device according to claim 1, wherein the classifying calculates, for each component, a value that indicates the degree of exception related to the information related to each of the components in the multiple devices and specifies a device, in which a value obtained by adding a value that indicates the degree of exception for each component that is determined to be the minority is equal to or greater than a predetermined threshold, as the device in which an exceptional setting is performed.

3. A non-transitory computer-readable recording medium having stored therein an update control program causing a computer to execute a process comprising:
calculating the similarity of each piece of component information related to each of multiple devices and classifying, on the basis of the calculated similarity, the multiple devices into one or multiple device groups, wherein the classifying determines, for each component, whether the information related to each of the components in the multiple devices is the majority or the minority, specifies a device, in which the number of components determined to be the minority is equal to or greater than a predetermined threshold, as a device in which an exceptional setting is performed, and classifies the specified device in the one or one of the multiple device groups; and
performing, by using a common method for updating software, a process for updating software running on devices that are classified into the same device group, wherein
the performing performs the process for updating software running on devices in the order of the devices that have a smaller number of components that are determined to be the minority or in the order of the devices that have a smaller value that is obtained by adding the value that indicates the degree of exception for each component that is determined to be the minority, and
when an abnormality occurs when software running on one of the devices is updated, the performing stops to update software running on subsequent devices.

4. An update control method comprising:
calculating the similarity of each piece of component information related to each of multiple devices and classifying, on the basis of the calculated similarity, the multiple devices into one or multiple device groups, wherein the classifying determines, for each component, whether the information related to each of the components in the multiple devices is the majority or the minority, specifies a device, in which the number of components determined to be the minority is equal to or greater than a predetermined threshold, as a device in which an exceptional setting is performed, and classifies the specified device in the one or one of the multiple device groups; and
performing, by using a common method for updating software, a process for updating software running on devices that are classified into the same device group, wherein
the performing performs the process for updating software running on devices in the order of the devices that have a smaller number of components that are determined to be the minority or in the order of the devices that have a smaller value that is obtained by adding the value that indicates the degree of exception for each component that is determined to be the minority, and
when an abnormality occurs when software running on one of the devices is updated, the performing stops to update software running on subsequent devices.

* * * * *